(12) United States Patent
Yoshida et al.

(10) Patent No.: US 11,367,269 B2
(45) Date of Patent: Jun. 21, 2022

(54) INFORMATION PROCESSING DEVICE AND INFORMATION PROCESSING SYSTEM

(71) Applicant: KYOCERA Document Solutions Inc., Osaka (JP)

(72) Inventors: Daisuke Yoshida, Osaka (JP); Tetsuji Yamaguchi, Osaka (JP); Yosuke Oka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 6 days.

(21) Appl. No.: 16/794,024

(22) Filed: Feb. 18, 2020

(65) Prior Publication Data

US 2020/0265262 A1 Aug. 20, 2020

(30) Foreign Application Priority Data

Feb. 18, 2019 (JP) .............................. JP2019-026603
Feb. 18, 2019 (JP) .............................. JP2019-026604

(51) Int. Cl.
*G06K 9/46* (2006.01)
*G06V 10/40* (2022.01)
*G06V 30/10* (2022.01)

(52) U.S. Cl.
CPC .............. *G06V 10/40* (2022.01); *G06V 30/10* (2022.01)

(58) Field of Classification Search
None
See application file for complete search history.

(56) References Cited

U.S. PATENT DOCUMENTS

| | | | | |
|---|---|---|---|---|
| 6,125,208 A | * | 9/2000 | Maier | G06K 9/66 382/228 |
| 6,826,625 B1 | * | 11/2004 | Fujise | H04L 29/06 358/400 |
| 7,133,556 B1 | * | 11/2006 | Matsushita | G06K 9/033 382/181 |
| 2009/0100050 A1 | * | 4/2009 | Erol | G06K 9/6217 |
| 2013/0308862 A1 | * | 11/2013 | Kubota | G06K 9/03 382/182 |
| 2017/0366744 A1 | * | 12/2017 | Cudak | H04N 5/232939 |
| 2018/0278795 A1 | | 9/2018 | Zhang | |

FOREIGN PATENT DOCUMENTS

JP 2018-160897 A 10/2018

* cited by examiner

*Primary Examiner* — Nancy Bitar
*Assistant Examiner* — Nicolas James Boyajian
(74) *Attorney, Agent, or Firm* — Studebaker & Brackett PC

(57) ABSTRACT

An information processing system includes an image reading device and an information processing device. The image reading device reads a document to generate target image data. The information processing device processes the target image data. The information processing device includes a first conversion processing section, a second conversion processing section, and a selection section. The first conversion processing section is capable of converting image data to character code data. The second conversion processing section is capable of converting image data to character code data. The selection section selects conversion of the target image data to character code data by the first conversion processing section or the second conversion processing section.

6 Claims, 24 Drawing Sheets

Transportation expense reimburse — 18

| First conversion processing<br>Second conversion processing (For fee)<br>※Matching rate 98% | Reading resolution<br>300 × 300<br>600 × 600<br>1200 × 1200 | Document size<br>A3<br>A4<br>A5 | Document orientation<br>Portrait<br>Landscape |
|---|---|---|---|

| Email address | abcdef@xxx.com |
|---|---|

FIG. 12A

Bill for company A — 18

| First conversion processing<br>Second conversion processing (For fee)<br>※Matching rate 100% | Reading resolution<br>300 × 300<br>600 × 600<br>1200 × 1200 | Document size<br>A3<br>A4<br>A5 | Document orientation<br>Portrait<br>Landscape |
|---|---|---|---|

| Email address | abcdef@xxx.com |
|---|---|

| Transportation expense reimburse | | | |
|---|---|---|---|
| Primary conversion processing (For fee) Secondary conversion processing ※Matching rate 98% | Reading resolution 300 × 300 600 × 600 1200 × 1200 | Document size A3 A4 A5 | Document orientation Portrait Landscape |
| Email address | abcdef@xxx.com | | |

FIG. 23B

| Bill for company A | | | |
|---|---|---|---|
| Primary conversion processing (For fee) Secondary conversion processing ※Matching rate 100% | Reading resolution 300 × 300 600 × 600 1200 × 1200 | Document size A3 A4 A5 | Document orientation Portrait Landscape |
| Email address | abcdef@xxx.com | | |

INFORMATION PROCESSING DEVICE AND INFORMATION PROCESSING SYSTEM

INCORPORATION BY REFERENCE

The present application claims priority under 35 U.S.C. § 119 to Japanese Patent Application Nos. 2019-026604 and 2019-026603, filed on Feb. 18, 2019. The contents of these applications are incorporated herein by reference in their entirety.

BACKGROUND

The present disclosure relates to an information processing device and an information processing system.

Character recognition has been known as a processing for recognizing characters in a document through reading of the document. Processing such as above is also called optical character recognition (OCR) processing. In the OCR processing, image data is converted to character code date.

A scanning system has been studied in which data scanned by a multifunction peripheral (MFP) is transmitted to an OCR server and the OCR server executes the OCR processing. In the scanning system, a format data portion of the scanned data is deleted and the OCR processing is performed on a remaining character string.

SUMMARY

An information processing system according to an aspect of the present disclosure includes an image reading device and an image reading device. The image reading device reads a document to generate target image data. The information processing device processes the target image data. The information processing device includes a first conversion processing section, a second conversion processing section, and a selection section. The first conversion processing section is capable of converting image data to character code data. The second conversion processing section is capable of converting image data to character code data. The selection section selects conversion of the target image data to character code data by the first conversion processing section or the second conversion processing section.

An information processing device according to an aspect of the present disclosure includes a first conversion processing section, a second conversion processing section, a communication section, and a selection section. The first conversion processing section is capable of converting image data to character code data. The second conversion processing section is capable of converting image data to character code data. The communication section receives and transmits target image data. The selection section selects conversion of the target image data to character code data by the first conversion processing section or the second conversion processing section.

BRIEF DESCRIPTION OF THE DRAWINGS

FIGS. 12A and 12B are each a schematic diagram of a display screen displayed by a display section of an image reading device in the information processing system according to the embodiment.

FIGS. 23A and 23B are each a schematic diagram of a display screen on a display section of an image reading device in the information processing system according to the embodiment.

DETAILED DESCRIPTION

Figure 1:
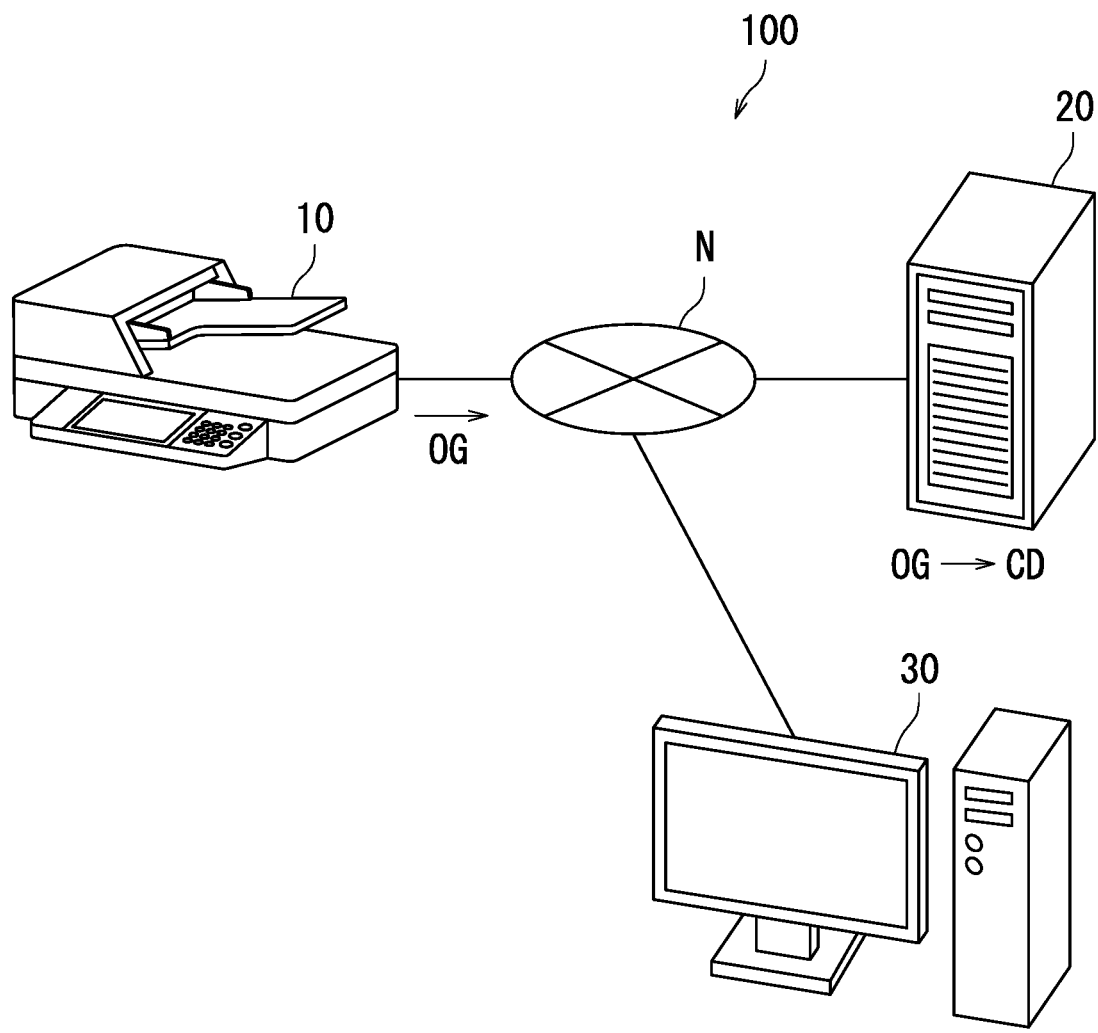
FIG. 1 is a schematic diagram of an information processing system according to an embodiment.

The following describes an embodiment of the present disclosure with reference to the accompanying drawings. Note that elements that are the same or equivalent are indicated by the same reference signs in the drawings and description thereof is not repeated.

A configuration of an information processing system 100 according to the present embodiment will be described first with reference to FIG. 1. FIG. 1 is a schematic diagram of the information processing system 100. The information processing system 100 includes an image reading device 10 and an information processing device 20.

The image reading device 10 and the information processing device 20 are connected to each other via a network N. The network N may be a local area network (LAN) or a wide area network (WAN). Alternatively, the network N may be the Internet.

The image reading device 10 reads a document to generate target image data OG. The image reading device 10 transmits the target image data OG to the information processing device 20.

No particular limitations are placed on a file format of the target image data OG. Examples of the file format of the target image data OG include portable document format (PDF), portable network graphics (PNG), tagged image film format (TIFF), and joint photographic experts group (JPEG).

The information processing device 20 receives the target image data OG from the image reading device 10. Here, a transmission source of the target image data OG is the image reading device 10.

The information processing device 20 processes the target image data OG. The information processing device 20 converts the target image data OG to character code data. The information processing device 20 converts the target image data OG to character code data CD through optical character recognition processing. For example, the information processing device 20 is a server. The character code data CD is data indicating a language, a number, or a sign.

No particular limitations are placed on a file format of the character code data CD. Examples of the file format of the character code data CD include extensible markup language (XML), PDF, word processing software, spreadsheet software, and presentation software.

For example, the information processing device 20 stores the character code data CD. It is possible that the information processing device 20 stores character code data in itself. Alternatively, the information processing device 20 may transmit character code data to another storage device to store the character code data in the storage device. For example, the information processing device 20 may transmit character code data to the image reading device 10. Alternatively, the information processing device 20 may facsimile character code data to another device.

The information processing device 20 may operate with the image reading device 10. For example, application software for driving the information processing device 20 may be installed in the image reading device 10. Upon activation of the application software installed in the image reading device 10, the image reading device 10 operates with the information processing device 20.

The information processing system 100 may further include another information processing device 30. The information processing device 30 is connected to the network N. The information processing device 20 is capable of transmitting the character code data CD to the information processing device 30. The information processing device 30 processes the character code data CD. Examples of the information processing device 30 include a personal computer (PC) and a smartphone.

Figure 2:
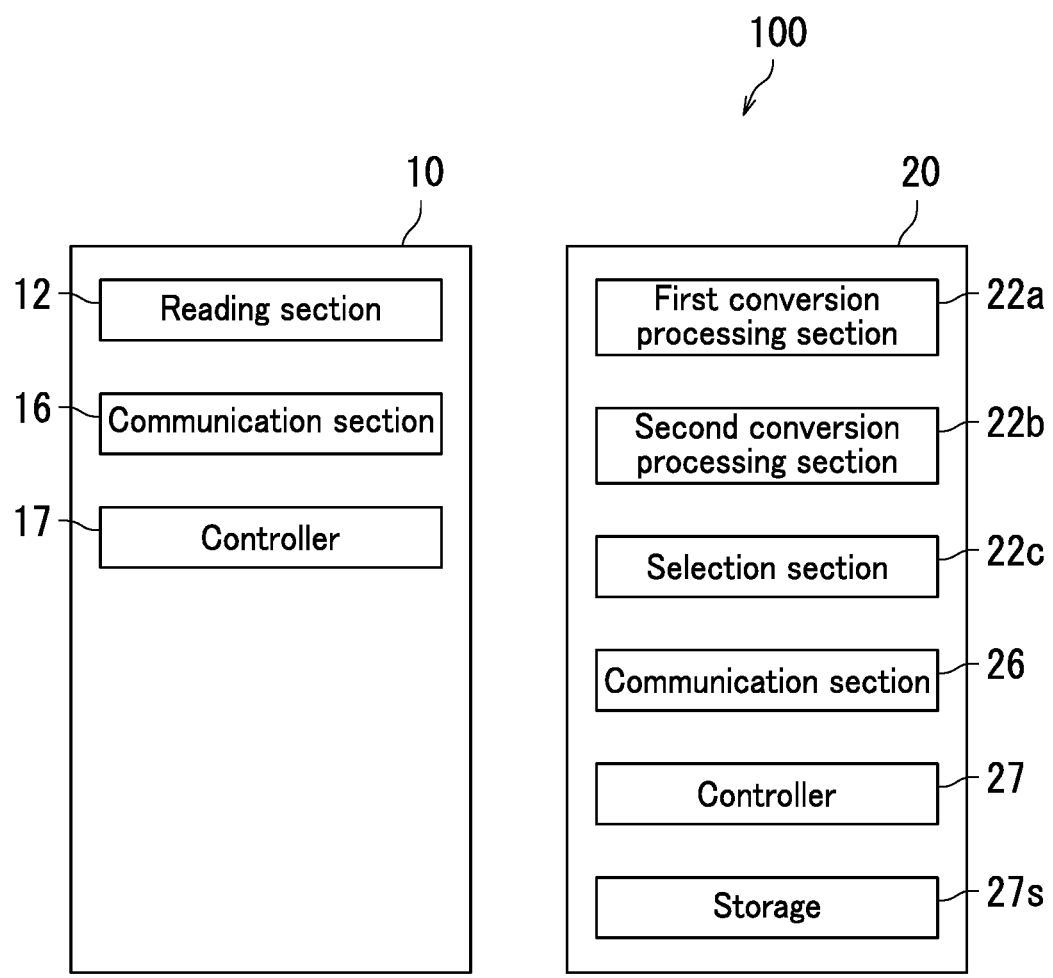
FIG. 2 is a schematic block diagram of the information processing system according to the embodiment.

The information processing system 100 according to the present embodiment will be described next with reference to FIGS. 1 and 2. FIG. 2 is a block diagram of the information processing system 100 according to the present embodiment.

The image reading device 10 includes a reading section 12, a communication section 16, and a controller 17. The controller 17 controls the reading section 12 and the communication section 16. The controller 17 includes a processor. The processor may include a central processing unit (CPU). Alternatively, the processor may include a microcomputer. Alternatively, the processor may include an application specific integrated circuit (ASIC).

The reading section 12 is capable of generating image data by document reading. The reading section 12 reads a document and generates the target image data OG.

The communication section 16 communicates with an external electronic device. Here, the communication section 16 transmits the target image data OG to the information processing device 20.

The information processing device 20 includes a first conversion processing section 22a, a second conversion processing section 22b, a selection section 22c, a communication section 26, a controller 27, and storage 27s. The controller 27 controls the first conversion processing section 22a, the second conversion processing section 22b, the selection section 22c, and the communication section 26. The controller 27 includes a processor. The processor may include a CPU, a microcomputer, or an ASIC.

The first conversion processing section 22a is capable of converting image data to character code data. For example, the first conversion processing section 22a is capable of converting the target image data OG to the character code data CD. In the present description, character code data converted by the first conversion processing section 22a may be referred to as first character code data or character code data CD1. Also in the present description, conversion processing by the first conversion processing section 22a may be referred to as first conversion processing.

Typically, when the first conversion processing section 22a converts image data to character code data, a recognition rate of the first conversion processing is also generated. The recognition rate indicates a rate of characters recognized as characters appropriately converted by the first conversion processing section 22a. In a situation in which the recognition rate is high, it is probable in many cases that the first conversion processing is appropriately performed with no error. In the present description, the recognition rate by the first conversion processing section 22a may be referred to as a first recognition rate.

The second conversion processing section 22b is capable of converting image data to character code data. For example, the second conversion processing section 22b is capable of converting the target image data OG to the character code data CD. In the present description, character code data converted by the second conversion processing section 22b may be referred to as second character code data or character code data CD2. Also in the present description, conversion processing by the second conversion processing section 22b may be referred to as second conversion processing.

When the second conversion processing section 22b converts image data to character code data, a recognition rate of the second conversion processing is also generated. In the present description, the recognition rate by the second conversion processing section 22b may be referred to as a second recognition rate.

The first conversion processing section 22a and the second conversion processing section 22b each convert image data to character code data. For example, the first conversion processing section 22a converts specific target image data to Japanese character code data. Similarly, the second conversion processing section 22b converts the same target image data to Japanese character code data.

However, even in a case where the target image data is the same and the first conversion processing section 22a performs the same type of conversion processing as the second conversion processing section 22b, the conversion processing by the first conversion processing section 22a is not necessarily the same as the conversion processing by the second conversion processing section 22b and the character code data CD1 may not be identical to the character code data CD2. For example, the first conversion processing section 22a performs conversion processing at a normal level and the second conversion processing section 22b performs conversion processing at a level higher than that of the conversion processing by the first conversion processing section 22a. In one example, the second conversion processing section 22b is able to appropriately convert image data that the first conversion processing section 22a is not able to convert appropriately. In this case, the second recognition rate is higher than the first recognition rate.

The selection section 22c selects conversion of target image data by either the first conversion processing section 22a or the second conversion processing section 22b. For example, the selection section 22c may select conversion of target image data by either the first conversion processing section 22a or the second conversion processing section 22b in accordance with a prescribed procedure. In one example, the selection section 22c may select target image data conversion by either the first conversion processing section 22a or the second conversion processing section 22b in accordance with the prescribed procedure before the information processing device 20 receives the target image data OG.

Alternatively, the selection section 22c may select conversion of target image data by either the first conversion processing section 22a or the second conversion processing section 22b according to user specification from the image reading device 10 that has generated the target image data OG. For example, the image reading device 10 generates target image data through document reading. Then, directly before, concurrently with, or directly after transmission of the target image data to the information processing device 20, the image reading section 10 specifies conversion of the generated target image data by either the first conversion processing section 22a or the second conversion processing section 22b. Thereafter, the selection section 22c may select conversion of the target image data by either the first conversion processing section 22a or the second conversion processing section 22b according to the specification from the image reading device 10.

At least one of the first conversion processing section 22a and the second conversion processing section 22b converts the target image data OG to character code data based on a result of selection by the selection section 22c. For example, when the selection section 22c selects conversion by the first conversion processing section 22a, the first conversion processing section 22a converts the target image data OG to the character code data CD1. By contrast, when the selection section 22c selects conversion by the second conversion processing section 22b, the second conversion processing section 22b converts the target image data OG to the character code data CD2.

Note that the selection section 22c may select conversion by either the first conversion processing section 22a or the second conversion processing section 22b multiple times. For example, it is possible that the selection section 22c first selects conversion processing by either one of the first conversion processing section 22a and the second conversion processing section 22b, and later selects the other of the first conversion processing section 22a and the second conversion processing section 22b when a result of conversion by the first-selected conversion processing section does not satisfy a prescribed condition.

The storage 27s stores a control program therein. The control program is stored in a non-transitory computer-readable storage medium. Examples of the non-transitory computer-readable storage medium include read-only memory (ROM), random-access memory (RAM), compact disc read-only memory (CD-ROM), magnetic tape, a magnetic disk, and an optical storage device. The controller 27 controls each element of configuration of the information processing device 20 through execution of the control program stored in the storage 27s.

In the information processing system 100 according to the present embodiment, at least one of the first conversion processing section 22a and the second conversion processing section 22b converts the target image data OG to character code data. For example, selection of conversion processing by either the first conversion processing section 22a or the second conversion processing section 22b may be performed based on an expense or charges for use. Alternatively, selection of conversion processing by either the first conversion processing section 22a or the second conversion processing section 22b may be performed based on each recognition rate.

Note that the magnitude correlation between the first recognition rate and the second recognition rate may be fixed regardless of the type of either or both the target image data and the character code data. For example, in a situation in which the second recognition rate is higher than the first recognition rate, performance of the second conversion processing section 22b is superior to that of the first conversion processing section 22a regardless of the type of either or both the target image data and the character code data.

Alternatively, the magnitude correlation between the first recognition rate and the second recognition rate may be changed according to the type of either or both the target image data and the character code data. For example, in a case of conversion of target image data to Japanese character code data, the second recognition rate may be higher than the first recognition rate. Also, in a case of conversion of target image data to English character code data, the first recognition rate may be higher than the second recognition rate.

Furthermore, a condition of use of the first conversion processing section 22a may differ from a condition of use of the second conversion processing section 22b. For example, the first conversion processing section 22a may be usable free of charge while the second conversion processing section 22b may be useable for a fee. Alternatively, the first conversion processing section 22a is usable free of license while the second conversion processing section 22b is usable under license. Alternatively, a usage fee for the first conversion processing section 22a is cheap while a usage fee for the second conversion processing section 22b is expensive. Alternatively, the usage fee for the first conversion processing section 22a is a flat fee while the usage fee for the second conversion processing section 22b is a usage-based fee.

Note that charges for use of the first conversion processing section 22a and the second conversion processing section 22b may be increased according to an amount of image data processed (amount of use) or fixed regardless of the amount of image data processed (amount of use). For example, the charges for use of the first conversion processing section 22a and the second conversion processing section 22b may be fixed for a specific time period regardless of an amount of image data processed (amount of use).

Typically, use of the first conversion processing section 22a may not be charged. For example, the first conversion processing section 22a may utilize an open source.

Use of the second conversion processing section 22b may be charged. For example, the second conversion processing section 22b may be software developed by a maker.

For example, in a case where a relatively less important document is a conversion target, the selection section 22c may select, based on a user setting, a conversion processing section for which a low usage fee is set. By contrast, in a case where a relatively highly important document is a conversion target, the selection section 22c may select, based on a user setting, a conversion processing section having a high recognition rate. In a case where a user desires to set conversion processing section selection on a status-by-status basis, the selection section 22c may query the user about a conversion processing section to be used for each conversion processing and select a conversion processing section according to a user instruction. Alternatively, the selection section 22c may select a conversion processing section based on a desired setting condition predetermined by the user.

For example, the first conversion processing section 22a is capable of converting image data to character code data including either or both a number and an alphabet at a high recognition rate, but may be incapable of converting image data to another character code data at a high recognition rate. The second conversion processing section 22b may be capable of converting image data to character code data including either or both a number and an alphabet at a high recognition rate. As described above, it is possible that the first conversion processing section 22a performs insufficient conversion to multibyte characters while the second conversion processing section 22b performs sufficient conversion to multibyte characters.

Note that the first conversion processing section 22a preferably acquires a recognition rate for character code data in conversion from image data to the character code data. The higher the recognition rate for character code data is, the more correct processing the first conversion processing section 22a performs in conversion from image data to character code data.

For example, in a case where multiple types of fonts for a language expressed by characters indicated in target image data are stored in the first conversion processing section 22a or a database from which the first conversion processing section 22a is capable of reading out data, the recognition rate by the first conversion processing section 22a for character code data increases. By contrast, in a case where one or two types of fonts for a language expressed by characters indicated in target image data are stored in the first conversion processing section 22a or a database from which the first conversion processing section 22a is capable of reading out data, the recognition rate by the first conversion processing section 22a for the character code data decreases. Similarly, the second conversion processing section 22b preferably acquires a recognition rate for character code data in conversion from image data to the character code data.

For example, the second conversion processing section 22b is capable of performing conversion processing with higher precision than the first conversion processing section 22a, but the usage fee for the second conversion processing section 22b may be higher than that for the first conversion processing section 22a. In one example, it is possible that charges for use of the second conversion processing section 22b is determined according to an amount of use, whereas the first conversion processing section 22a is permitted to be used without limit of use only for a user of the information processing device 20.

The first conversion processing section 22a and the second conversion processing section 22b may each extract as metadata a portion of character code data to which image data has been converted. Furthermore, character code data itself may or may not be stored as a file. In a case where character code data is stored as a file, the extracted metadata may be attached as a file name to the character code data.

Figure 3:
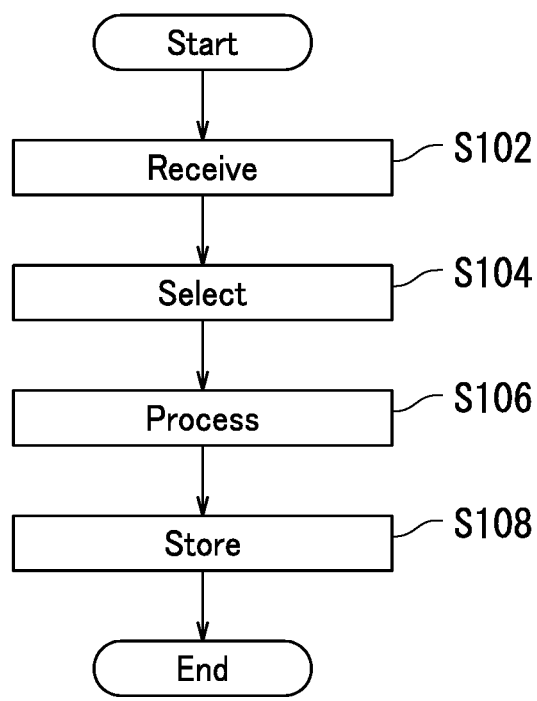
FIG. 3 is a flowchart depicting information processing performed by an information processing device in the information processing system according to the embodiment.

The following describes an information processing method implemented by the information processing device 20 in the present embodiment with reference to FIGS. 1 to 3. FIG. 3 is a flowchart depicting an information processing method implemented by the information processing device 20 in the present embodiment.

First, target image data is received in Step S102. The image reading device 10 reads a document, generates target image data OG, and transmits the target image data OG to the information processing device 20. The information processing device 20 receives the target image data OG from the image reading device 10.

Selection was performed as to which of the first conversion processing section conversion processing section 22a or the second conversion processing section 22b of the information processing device 20 is to convert the target image data OG to character code data in Step S104. In detail, the selection section 22c selects conversion processing of the target image data OG to character code data by either the first conversion processing section 22a or the second conversion processing section 22b.

The selection section 22c may select conversion processing of the target image data by either the first conversion processing section 22a or the second conversion processing section 22b in accordance with a prescribed procedure. Alternatively, the selection section 22c may select conversion of the target image data by either the first conversion processing section 22a or the second conversion processing section 22b according to user specification input to the image reading device 10.

The selected conversion processing section converts the target image data OG to the character code data CD in Step S106. Note that it is possible that in a situation in which a result of conversion by a conversion processing section selected by the selection section 22c does not satisfy a prescribed requirement, a conversion processing section that has not been selected first by the selection section 22c is selected and the later-selected conversion processing section converts the target image data OG to the character code data CD. For example, it is possible that in a case where a conversion processing section selected first by the selection section 22c has a recognition rate lower than a threshold, a conversion processing section that has not been selected first by the selection section 22c is selected next and the later-selected conversion processing section converts the target image data OG to the character code data CD.

The storage 27s stores the character code data CD in Step S108. The storage 27s may store the character code data as XML data. Alternatively, the storage 27s may store the character code data as metadata.

The storage 27s preferably stores the character code data in a searchable format. For example, the storage 27s may store character code data corresponding to target image data in a PDF format in a searchable manner. In one example, the storage 27s may store character code data corresponding to the entirety of target image data in the PDF format. Alternatively, the storage 27s may store character code data corresponding to a portion of target image data in a PDF format.

According to the present embodiment, a plurality of conversion processing sections is selectable for use as described with reference to FIG. 3. Therefore, multiple types of conversion processing can be used properly according to for example importance or cost of the document.

Note that it is preferable that the document is in a fixed format and target image data is in a fixed format. For example, the document is a bill in a fixed format. Typically, examples of items described in a bill include a billing address, a billing amount, date of issue, and a remittance deadline. In general, bills issued by the same issuer are in the same format.

In one example, a billing address is located upper right of a bill while a billing amount is located lower right of the bill. In this case, when the image reading device 10 reads the bill and generates target image data, the information processing device 20 generates character code data corresponding to the target image data. In this manner, the information processing device 20 is able to favorably convert a document to a character code.

Note that it is possible that the selection section 22c selects the first conversion processing section 22a first and then determine whether or not to perform conversion processing by the second conversion processing section 22b after conversion processing by the first conversion processing section 22a. Whether or not to perform conversion processing by the second conversion processing section 22b may be determined based on comparison between a threshold and a recognition rate at conversion by the first conversion processing section 22a.

For example, in a situation in which the threshold is set to 80% and the recognition rate of conversion processing by the first conversion processing section 22a is 75%, the second conversion processing section 22b converts target image data to the second character code data and the second character code data corresponding to the target image data is used. By contrast, in a situation in which the recognition rate of conversion processing by the first conversion processing section 22a is 85%, the second conversion processing section 22b does not perform conversion processing and the first character code data corresponding to the target image data is used.

Note that after target image data is converted to character code data, a person checks indication based on the character code data with naked eye in many case. For example, the amount of use of the second conversion processing section 22b is fixed per month, the threshold may be changed according to an amount of use of the second conversion processing section 22b in a month of concern. Alternatively, character code data to which the target image data has been converted may be subjected to acceptance inspection by an acceptance inspection device.

For example, the threshold may be increased when an allowable amount of use of the second conversion processing section 22b in a month of concern is large. In one example, through change of the threshold changed from 80% to 90%, the second conversion processing section 22b converts target image data to the second character code data and the second character code data corresponding to the target image data is used even when the first conversion processing section 22a has a recognition rate of conversion processing of 85%.

Threshold may be decreased when an allowable amount of use of the second conversion processing section 22b in a month of concern is small. In one example, through change of the threshold from 80% to 70%, the second conversion processing section 22b does not perform conversion processing and the first character code data corresponding to the target image data is used even when the recognition rate of conversion processing by the first conversion processing section 22a is 75%.

Figure 4:
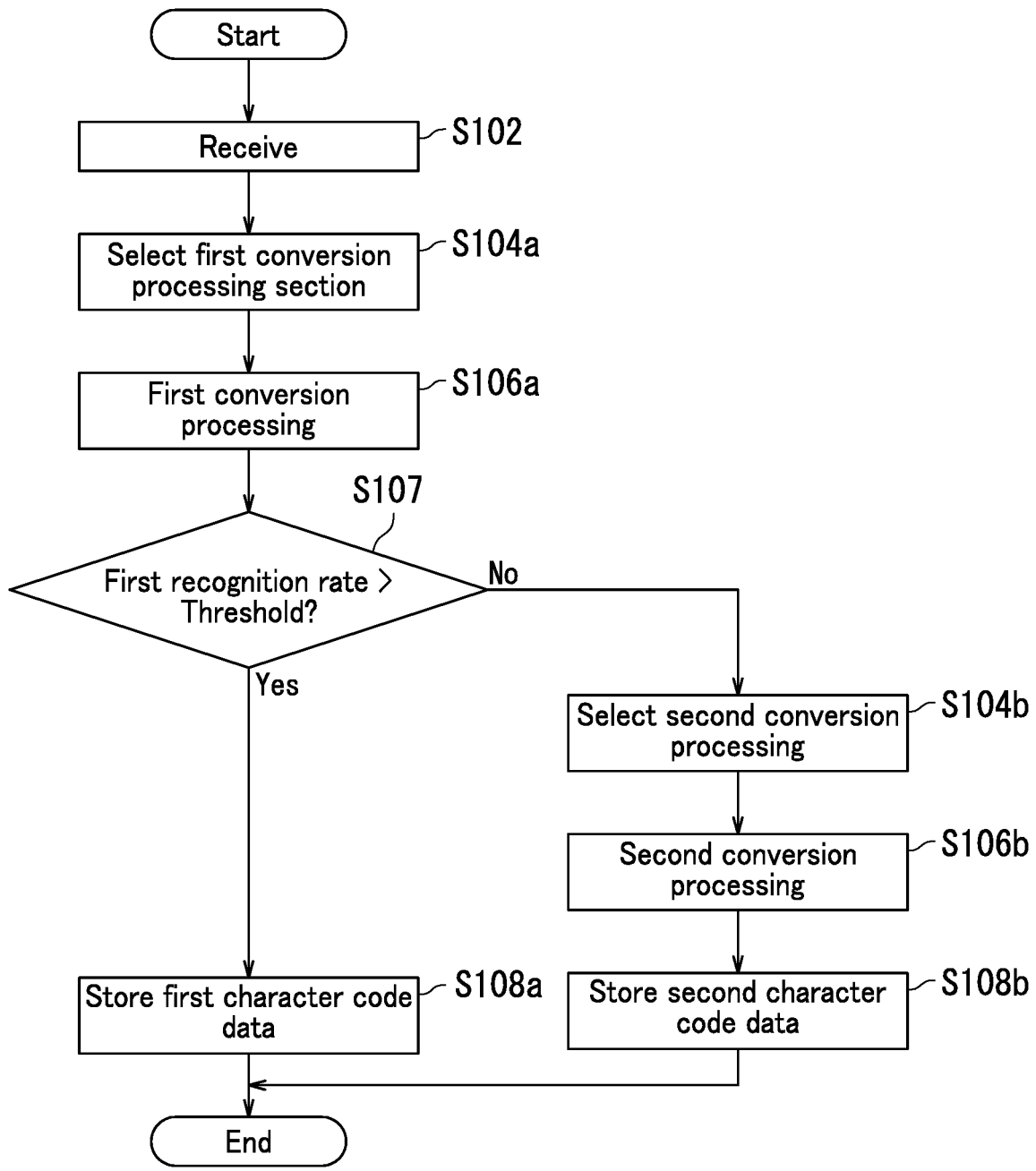
FIG. 4 is a flowchart depicting information processing performed by the information processing device in the information processing system according to the embodiment.

The following describes an information processing method implemented by the information processing system 100 according to the present embodiment with reference to FIGS. 1, 2, and 4. FIG. 4 is a flowchart depicting an information processing method implemented by the information processing device 20 according to the present embodiment. The flowchart of FIG. 4 is similar to the flowchart of FIG. 3 in almost all aspects other than that the second conversion processing may be performed according to the recognition rate after the first conversion processing. Duplicate description is therefore omitted in order to avoid redundancy.

First, target image data OG is received in Step S102. The image reading device 10 reads a document, generates target image data OG and transmits the target image data OG to the information processing device 20. The information processing device 20 receives the target image data OG from the image reading device 10.

The selection section 22c selects the first conversion processing section 22a in Step S104a. Here, the selection section 22c is preset to select the first conversion processing section 22a.

Thereafter, the first conversion processing section 22a converts the target image data OG to character code data CD1 in Step S106a. A first recognition rate is generated in the first conversion processing.

The selection section 122c determines whether or not the first recognition rate is larger than the threshold in Step S107. When it is determined that the first recognition rate is larger than the threshold (Yes in Step S107), the process proceeds to S108a. The storage 27s stores the character code data CD1 in Step S108a.

When it is determined that the first recognition rate is not larger than the threshold (No in Step S107), the process proceeds to S104b. The selection section 22c selects the second conversion processing section 22b in Step S104b. Here, the selection section 22c is preset to select the second conversion processing section 22b.

Thereafter, the second conversion processing section 22b converts the target image data OG to the character code data CD2 in Step S106b. A second recognition rate is generated in the second conversion processing. Note that the second recognition rate is typically higher than the first recognition rate. The storage 27s then stores the character code data CD2 in Step S108b. The information processing by the information processing device 20 ends then.

The information processing device 20 converts target image data to character code data in a manner as described above. According to present embodiment, the character code data after conversion has been subjected to conversion at a recognition rate over the threshold or a higher recognition rate than those in the information processing device 20. This can achieve use of character code data subjected to conversion processing with sufficient precision.

Note that the storage 27s stores the character code data CD2 in step S108b described with reference to FIG. 4, which should not be taken to limit the present embodiment. It is possible that the selection section 22c performs comparison between the first recognition rate and the second recognition rate after the second conversion processing and determines a higher recognition rate and the storage 27s stores character code data having the higher recognition rate.

Note that the information processing device 20 may be set through the image reading device 100. For example, the order of selection of the first conversion processing section 22a and the second conversion processing section 22b by the selection section 122c may be set through the image reading device 10.

Furthermore, a process flow (workflow) for image data generated in the image reading device 10 may be set in the image reading device 10. For example, folders storing character code data can be differentiated according to documents through workflow setting.

In one example, by generating pieces of target image data through reading a plurality of documents describing personal IDs and corresponding personal information, pieces of electronic data corresponding to the personal information described in the respective documents can be stored individually in a plurality of folders created for the respective personal IDs.

Furthermore, by setting storage sites of respective pieces of target image data generated by reading bills by the image reading device 10 through a workflow, character code data corresponding to billing-related information described in a plurality of documents can each be stored individually in a corresponding one of folders. Here, the bills each describe a billing address, a billing number, a billing item, and a billing amount and the folders are created for each billing address.

Note that in a case where the first conversion processing section 22a performs the first conversion processing on target image data, the first conversion processing section 22a may perform the first conversion processing on the entirety of the target image data. Alternatively, the first conversion processing section 22a may perform the first conversion processing on a specific region of the target image data. In this case, the specific region of the target image data is preferably designated in advance.

Similarly, in a case where the second conversion processing section 22b performs the second conversion processing on target image data, the second conversion processing section 22b may perform the second conversion processing on the entirety of the target image data. Alternatively, the second conversion processing section 22b may perform the second conversion processing on a target region of the target image data. In this case, the target region is preferably designated in advance.

Figure 5:
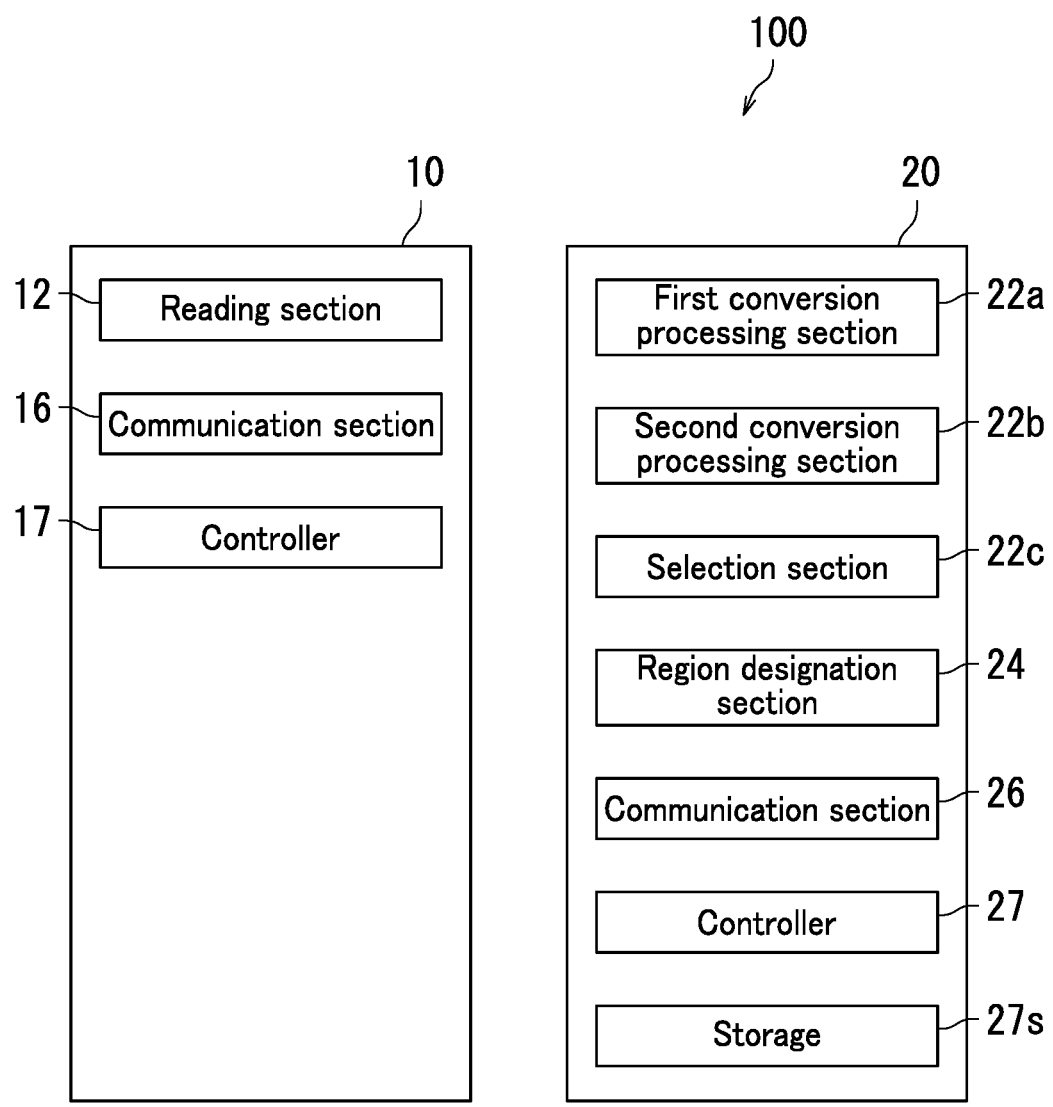
FIG. 5 is a schematic block diagram of an information processing system according to the embodiment.

An information processing system 100 according to the present embodiment will be described next with reference to FIG. 5. FIG. 5 is a schematic diagram of the information processing system 100. The information processing system 100 in FIG. 5 has a configuration similar that of the information processing system 100 described with reference to FIG. 2 in almost all aspects other than that the information processing device 20 further includes a region designation section 24. Duplicate description is therefore omitted in order to avoid redundancy.

The information processing device 20 further includes a region designation section 24 in addition to the first conversion processing section 22a, the second conversion processing section 22b, the selection section 22c, the communication section 26, the controller 27, and the storage 27s. The region designation section 24 designates a target region of target image data that is to be subjected to conversion processing. Typically, the information processing device 20 receives target image data on a page-by-page basis of a document. The region designation section 24 designates a target region of target image data to be subjected to conversion processing for each piece of target image data corresponding to one of pages of the document.

The region designation section 24 may designate a target region to be subjected to conversion processing for every target image data received from the image reading device 10. Alternatively, the region designation section 24 may designate a target region to be subjected to conversion processing according to target image data. For example, the region designation section 24 may designate a target region of target image data that is to be subjected to conversion processing based on a designation signal from the image reading device 10.

For example, when a target region to be subjected to conversion processing is designated, a conversion processing section selected from among the first conversion processing section 22a and the second conversion processing section 22b converts the designated target region of the target image data to a character code.

In one example, a user of the image reading device 10 may specify which of the first conversion processing section 22a or the second conversion processing section 22b is to perform conversion processing according to a character described in a document. For example, on the assumption that the second conversion processing section 22b has a higher recognition rate than the first conversion processing section 22a for a character described in a first region of a document, the selection section 22c selects the second conversion processing section 22b for processing a portion of the target image data corresponding to the first region of the document. By contrast, on the assumption that the first conversion processing section 22a has a higher recognition rate than the second conversion processing section 22c for a character described in a second region of the document, the selection section 22c selects the first conversion processing section 22a for processing a portion of the target image data corresponding to the second region of the document.

Note that reading of documents by the image reading device 10 may generate different image data even when the documents are the same as each other. For example, in a case where the image reading device 10 uses an auto document feeder (ADF) for document reading, pieces of generated image data may differ from one another depending on a reading state. For the above reason, it is possible that a specific reference mark is provided on a document and the information processing device 20 designates a target region of target image data by referring to the reference mark as a reference.

Figure 6:
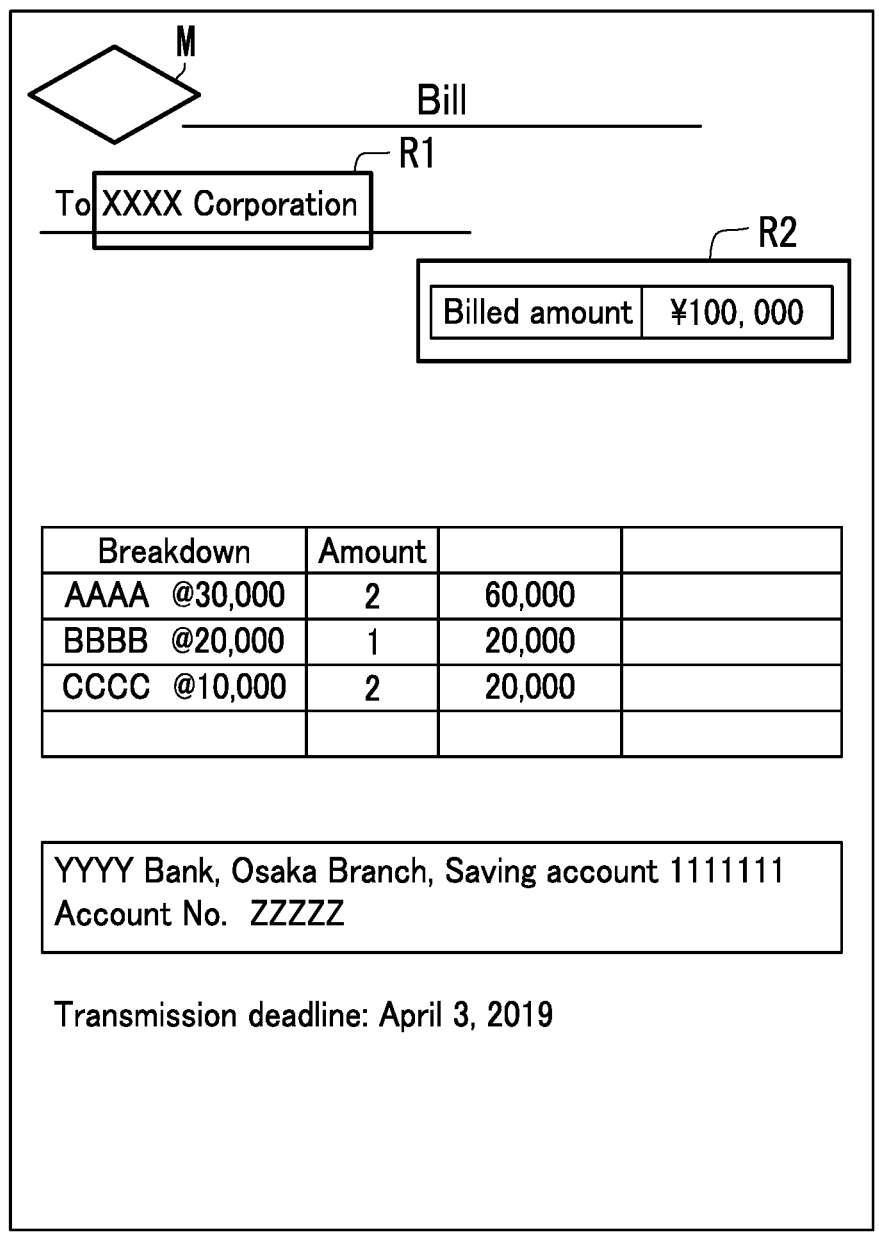
FIG. 6 is a schematic diagram illustrating image data having a designated region in the information processing system according to the embodiment.

The following describes region designation performed by the information processing device 20 in the information processing system 100 according to the present embodiment with reference to FIGS. 5 and 6. FIG. 6 is a schematic diagram of target image data having a designated region. Here, the document is a bill and the target image data is generated by reading the bill.

As illustrated in FIG. 6, regions R1 and R2 are designated in the target image data. The region R1 is designated in correspondence with a column of a billing address of the bill. The region R2 is designated in correspondence with a column of a billing amount of the bill.

Through conversion processing on the region R1 by either the first conversion processing section 22a or the second conversion processing section 22b of the information processing device 20, character code data indicating the billing address can be generated. Furthermore, through conversion processing on the region R2 by either the first conversion processing section 22a or the second conversion processing section 22b, character code data indicating the billing amount can be generated.

Note that the bill that is a document bears a reference mark M. Therefore, the region designation section 24 can set the regions R1 and R2 for the target image data by referring to the reference mark M. Accordingly, highly precise conversion processing on a specific region can be achieved even if image data diverse to some extent is generated in document reading.

Note that in designation of a target region of target image data to be subjected to conversion processing, a result of conversion processing on the target region may not make sense when a read document differs from a document having a preset target region. For example, when conversion processing by either the first conversion processing section 22a or the second conversion processing section 22b on a target region of target image data designated by the region designation section 24 results in a low recognition rate, a document that is a source of the target image data may not be in a predetermined format. In view of the foregoing, it is possible that the storage 27s separately stores character code data having a low recognition rate and character code data having a high recognition rate and the information processing device 20 outputs only the character code data having the high recognition rate.

Note that the selection section 22c selects either the first conversion processing section 22a or the second conversion processing section 22b in accordance with the prescribed procedure in the above description with reference to FIGS. 1 to 6, which should not be taken to limit the present embodiment. The selection section 22c may select either the first conversion processing section 22a or the second conversion processing section 22b based on specification from the image reading device 10 that has generated the target image data.

Figure 7:
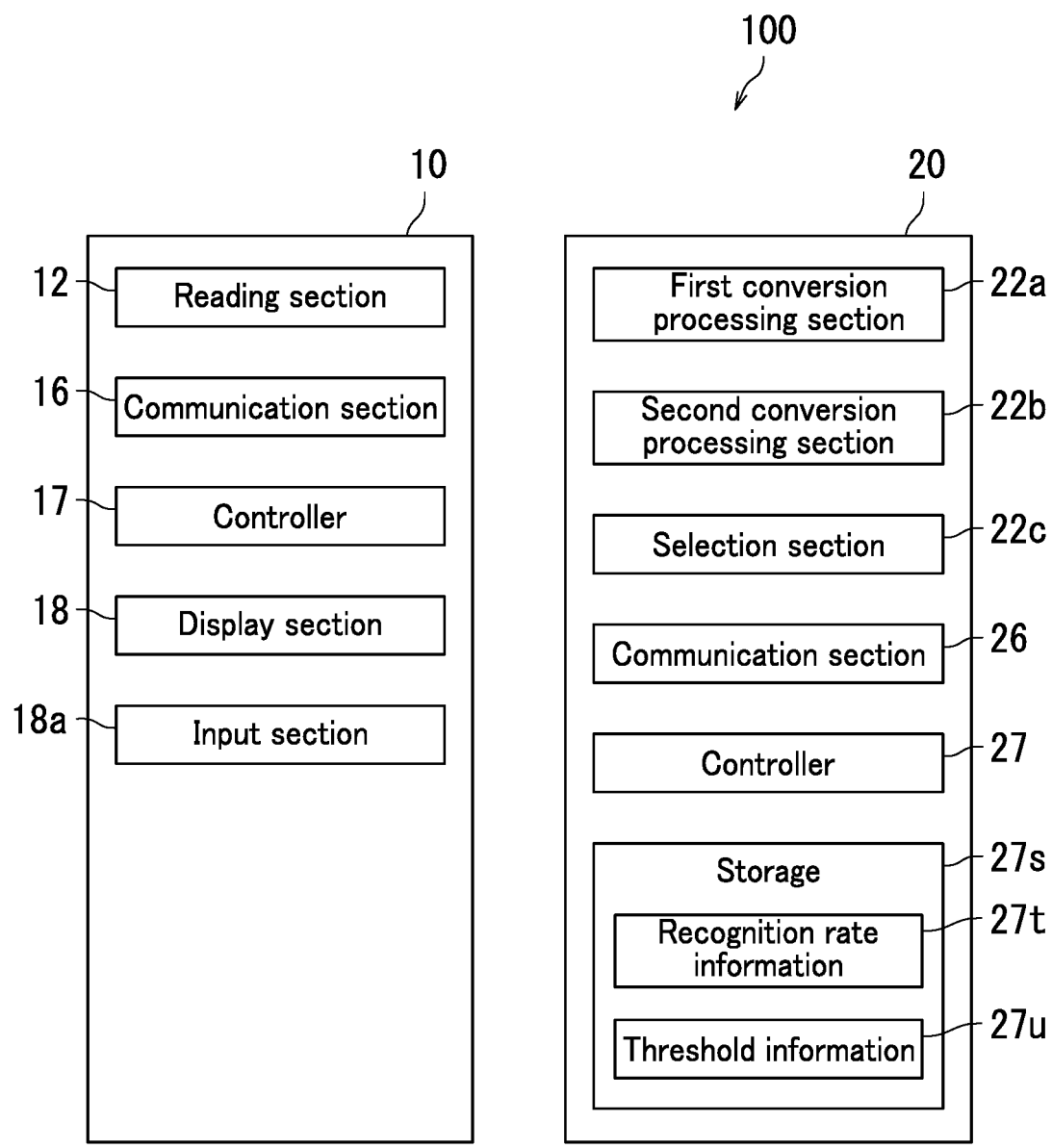
FIG. 7 is a schematic block diagram of an information processing system according to the embodiment.

An information processing system 100 according to the present embodiment will be described next with reference to FIG. 7. FIG. 7 is a schematic diagram of the information processing system 100. The information processing system 100 includes an image reading device 10 and an information processing device 20. The information processing system 100 in FIG. 7 has a configuration similar to that of the information processing system 100 described with reference to FIG. 2 in almost all aspects other than that the image reading device 10 further includes a display section 18 and an input section 18a. Duplicate description is therefore omitted in order to avoid redundancy.

The image reading device 10 includes a display section 18 and an input section 18a in addition to the reading section 12, the communication section 16, and the controller 17. The controller 17 controls the reading section 12, the communication section 16, the display section 18, and the input section 18a.

The display section 18 includes a display. For example, the display includes a liquid-crystal display or an organic electroluminescent display.

The input section 18a receives input of a user instruction. The input section 18a includes a keyboard and a mouse. Alternatively, the input section 18a may include a touch sensor. Note that the display section 18 and the input section 18a may be integrated into a touch panel.

The input section 18a is capable of inputting information used for specifying a conversion processing section that is to convert the target image data OG generated by document reading. The user is allowed to specify the first conversion processing section 22a of the information processing device 20 through the input section 18a so that the first conversion processing section 22a performs conversion processing on the target image data OG. In specification as above, the communication section 16 transmits to the communication section 26 of the information processing device 20 a specification signal indicating that the first conversion processing section 22a has been specified. Transmission of the specification signal may be performed directly before, concurrently with, or directly after transmission of the target image data OG.

Alternatively, the user is allowed to specify the second conversion processing section 22b of the information processing device 20 through the input section 18a so that the second conversion processing section 22b performs conversion processing on the target image data OG. In specification as above, the communication section 16 transmits to the communication section 26 of the information processing device 20 a specification signal indicating that the second conversion processing section 22b has been specified. Transmission of the specification signal may be performed directly before, concurrently with, or directly after transmission of the target image data OG.

The information processing device 20 includes the first conversion processing section 22a, the second conversion processing section 22b, the selection section 22c, the communication section 26, the controller 27, and the storage 27s. The storage 27s stores recognition rate information 27t and threshold information 27u therein.

The recognition rate information 27t separately contains recognition rates on conversion processing-by-conversion processing basis. Specifically, the recognition rate information 27t separately contains a first recognition rate by the first conversion processing section 22a and a second recognition rate by the second conversion processing section 22b. Preferably, the recognition rate information 27t separately contains recognition rates on a workflow-by-workflow basis. In this case, it is highly probable that determination using a past recognition rate is appropriate because the format of the document is the same as a past read document.

Preferably, the threshold information 27u separately contains thresholds on a workflow-by-workflow basis. For example, the threshold may be low in conversion processing on a large number of numbers described in a document. Alternatively, the threshold is preferably high in conversion processing on a large number of sentences described in a document. As described above, the threshold used may differ according to types of characters describe in a document.

According to the present embodiment, the image reading device 10 can select a conversion processing section to convert image data obtained by document reading. In the above configuration, the user of the image reading device 10 can determine as desires which of the conversion processing sections of the information processing device 20 is to perform conversion processing on image data read generated by document reading.

The image reading device 10 preferably displays information about conversion processing to the user before the user specifies which conversion processing section of the information processing device 20 is to perform conversion processing. The display section 18 displays information about conversion processing before either the first conversion processing section 22a or the second conversion processing section 22b of the information processing device 20 is selected.

In this case, the image reading device 10 preferably reads out information about conversion processing from the information processing device 20 before the display section 18 displays the information about the conversion processing. The communication section 16 of the image reading device 10 requests the communication section 26 of the information processing device 20 to transmit the recognition rate information 27t stored in the storage 27s. The communication section 26 transmits the recognition rate information 27t to the communication section 26 in response to the request from the communication section 16. Accordingly, the display section 18 is able to display the recognition rate information 27t.

Figure 8A:
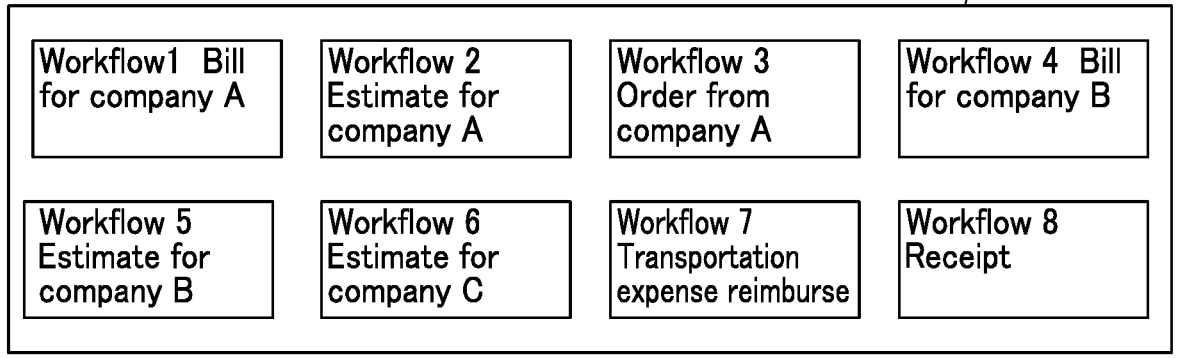
FIGS. 8A to 8C are each a schematic diagram of a display screen displayed by a display section of an image reading device in the information processing system according to the embodiment.
Figure 8B:
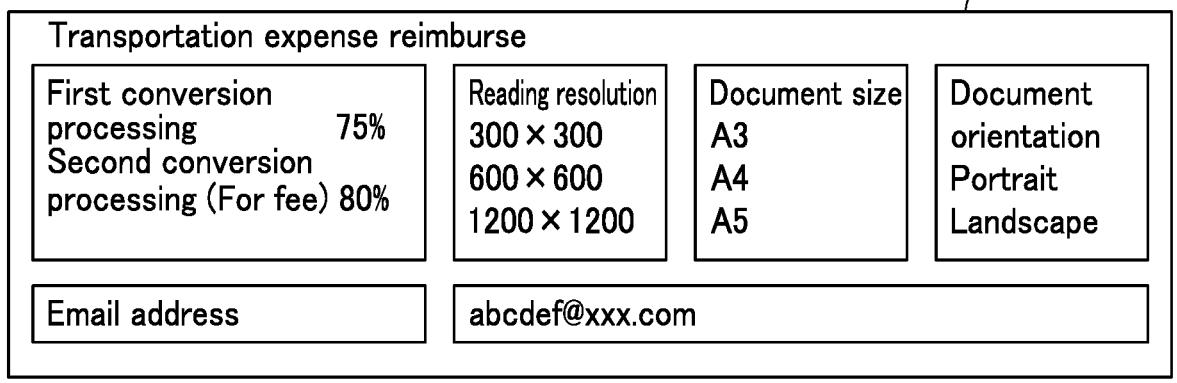
Figure 8C:
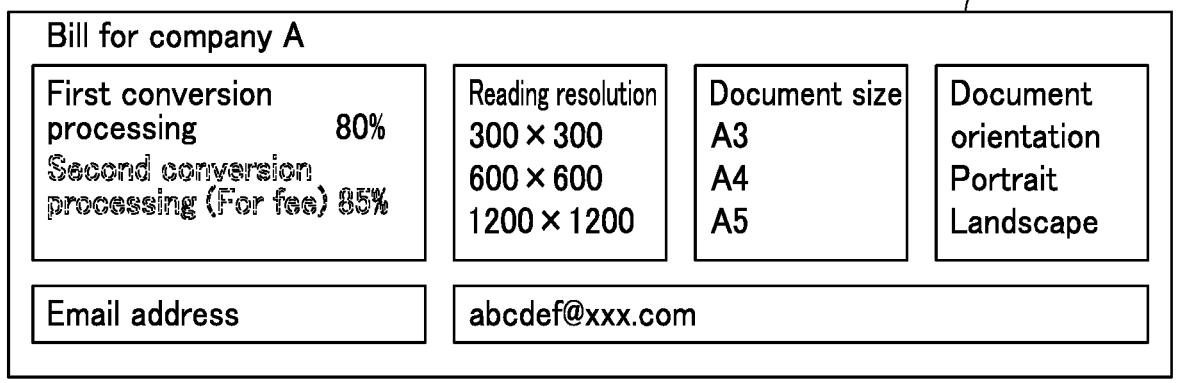

The following describes specification of a conversion processing section in the image reading device 10 according to the present embodiment with reference to FIGS. 8A to 8C. FIGS. 8A to 8C are each a schematic diagram of a display screen displayed by the display section 18 of the image reading device 10.

FIG. 8A is a schematic diagram of a display screen displayed by the display section 18 at a start of reading and conversion processing for a document R. As illustrated in FIG. 8A, the display screen displayed by the display section 18 includes a plurality of blocks. The display section 18 displays 4 blocks arranged in a left-right direction in an upper part of the display screen and 4 blocks arranged in the left-right direction in a lower part thereof. That is, the display section 18 displays 8 blocks in total. "Bill for company A" is indicated as a workflow 1 in an upper left end block. When the user selects this block through the input section 18a, the communication section 16 of the image reading device 10 reads out information relating to a "bill for a company A" from the storage 27s of the information processing device 20 through communication with the communication section 26 of the information processing device 20, and displays the read information on the display screen of the display section 18.

Note that respective blocks corresponding to a workflow 2, a workflow 3, and a workflow 4 are displayed likewise the upper left end block from left to right in the stated order in the upper part of the display section 18 as illustrated in FIG. 8A. The workflow 2 corresponds to "Estimate for company A". The workflow 3 corresponds to "Order from company A". The workflow 4 corresponds to "Bill for company B".

Furthermore, respective blocks corresponding to a workflow 5, a workflow 6, a workflow 7, and a workflow 8 are displayed from left to right in the stated order in the lower part of the display section 18. The workflow 5 corresponds to "Estimate for company B". The workflow 6 corresponds to "Estimate for company C". The workflow 7 corresponds to "Transportation expense reimbursement". The workflow 8 corresponds to "Receipt".

For example, in order for the user of the image reading device 10 to cause reading of a document relating to transportation expense reimbursement, the user of the image reading device 10 selects the block of the workflow 7 through the input section 18a. Upon selection of the block of the workflow 7, the communication section 16 reads out a recognition rate relating to transportation expense reimbursement stored in the storage 27s of the information processing device 20 through the communication section 26 of the information processing device 20. The display section 18 of the image reading device 10 displays the read recognition rate on the display screen.

FIG. 8B is a schematic diagram of a display screen displayed by the display section 18 upon selectin of the workflow 7. As illustrated in FIG. 8B, the display section 18 displays a display screen indicating a block for setting conversion processing information, reading resolutions, document sizes, document orientations, and an output destination of character code data.

The conversion processing information indicates selectable conversion processing sections, their expenses, and their recognition rates. Here, the information processing device 20 includes the first conversion processing section 22a for which no fees are charged for each use and the second conversion processing section 22b for which a fee is charged for each use. As such, the display section 18 displays the first conversion processing section 22a and the second conversion processing section 22b as the conversion processing information and "For fee" is indicated beside the second conversion processing section 22b. The conversion processing information contains an average recognition rate in reading documents relating to transportation expense reimbursement that the first conversion processing section 22a or the second conversion processing section 22b have read in the past. Note that the average recognition rate may be an average recognition rate of all documents relating to transportation expense reimbursement read in the past. Alternatively, the average recognition rate may be an average recognition rate relating to transportation expense reimbursement in a past month.

In FIG. 8B, the average recognition rate by the first conversion processing section 22a is 75% while the average recognition rate by the second conversion processing section 22b is 80%.

The user of the image reading device 10 can select either the first conversion processing section 22a or the second conversion processing section 22b while viewing the conversion processing information. For example, the first conversion processing section 22a can be selected by the user touching a region of the display screen corresponding to the first conversion processing section 22a. The second conversion processing section 22b can also be selected by the user touching a region thereof corresponding to the second conversion processing section 22b.

The display section 18 displays a plurality of reading resolutions as reading resolution candidates. Examples of the reading resolution candidates include 300×300, 600×600, and 1200×1200. The user of the image reading device 10 is allowed to select a reading resolution from among the displayed reading resolution candidates. For example, 300×300 can be selected as a reading resolution of the reading section 12 through user touching a region of a display screen corresponding to 300×300 as a reading resolution. In reading, the reading section 12 performs document reading at a selected reading resolution and generates target image data. Thereafter, the target image data is transmitted to the communication section 26 of the information processing device 20 from the communication section 16.

The display section 18 displays document size candidates. Examples of the document size candidates herein include A3, A4, and A5. The user of the image reading device 10 selects a document size from among the document size candidates. For example, in a case where the document size is A4, the user selects A4 as the document size. In reading, the reading section 12 reads a document by the selected document size and generates target image data.

The display section 18 displays document orientations. Examples of the document orientations herein include portrait orientation or landscape orientation. In a case where the orientation of a document is the portrait orientation, the document orientation is set so that the longitudinal direction of the document extends in a main scanning direction of the reading section 12. In a situation in which the orientation of the document is the landscape orientation, the document orientation is set so set that the longitudinal direction of the document extends in a sub-scanning direction of the reading section 12. For example, in a situation in which a document is arranged so that the longitudinal direction thereof extends in the main scanning direction, the user selects the portrait orientation as the document orientation. In reading, the reading section 12 reads the document within a region of the selected document size in the selected orientation, and generates target image data.

The display section 18 displays an output destination of character code data. The character code data to which the target image data has been converted in the information processing device 20 is transmitted to the specified output destination. The character code data herein is output to a specific address via an email.

As described above, it is possible in the information processing device 20 that no fee according to use is charged for the first conversion processing section 22a while a fee according to use is charged for the second conversion processing section 22b. In this case, when a past recognition rate by the first conversion processing section 22a is relatively high, it is highly probable that a recognition rate is relatively high even when the first conversion processing section 22a is used for conversion processing on image data of a document in this time for the sake of suppressing expense increase. In this case, therefore, the display section 18 may display the second conversion processing section 22b in a shaded manner so that the second conversion processing section 22b is not to be selected.

FIG. 8C is a schematic diagram of a display screen displayed by the display section 18 upon selection of the workflow 1. FIG. 8C is similar to FIG. 8B in almost all aspects except the selected workflow and the average recognition rate, and therefore, overlapped description is omitted.

Note that the average recognition rate by the first conversion processing section 22a is 80% while the average recognition rate by the second conversion processing section 22b is 85% in FIG. 8C. As described above, the average recognition rate by the first conversion processing section 22a is relatively high for "Bill for company A" of the workflow 1. Therefore, it is highly probable that image data of a document can be converted to character data by the first conversion processing section 22a at a high recognition rate without using the second conversion processing section 22b. For the reason as above, the display section 18 displays the second conversion processing section 22b in a shaded manner. As such, the user of the image reading device 10 selects the first conversion processing section 22a rather than the second conversion processing section 22b, thereby achieving expense saving.

Figure 9:
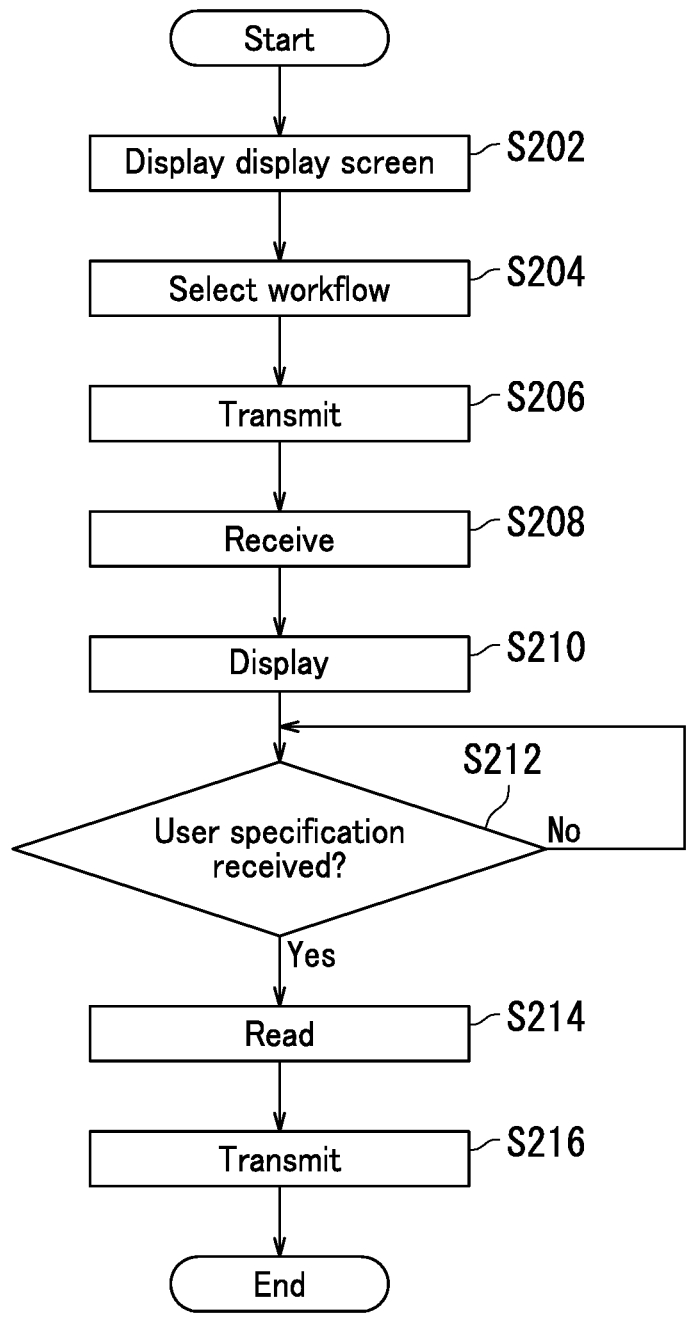
FIG. 9 is a flowchart depicting information processing performed by the image reading device in the information processing system according to the embodiment.

The following describes an information processing method implemented by the image reading device 10 according to the present embodiment with reference to FIGS. 1 and 7 to 9. FIG. 9 is a flowchart depicting the information processing method implemented by the image reading device 10 according to the present embodiment.

First, the image reading device 10 displays a display screen for document reading and conversion processing in Step S202. Specifically, when the user of the image reading device 10 performs input on the input section 18a for starting character recognition processing, the display section 18 displays a display screen for character recognition processing. For example, the display section 18 displays the display screen illustrated in FIG. 8A.

The user of the image reading device 10 selects a specific workflow from among those indicated in the display screen for character recognition in Step S204.

In Step S206, the communication section 16 transmits a request to read out information relating to the specific workflow to the information processing device 20.

In Step S208, the communication section 16 receives the information relating to the specific workflow from the information processing device 20. For example, the communication section 16 receives the average recognition rate in the specific workflow.

In Step S210, the display section 18 displays the information relating to the specific workflow. For example, the display section 18 displays the display screen illustrated in FIG. 8B.

In step S212, the controller 17 determines whether or not the input section 18a has received input. When it is determined that the input section 18a has received no input (No in Step S212), the process returns to Step S212 and waits for input to the input section 18a.

When the controller 17 determines that the input section 18a has received input (Yes in Step S212), the process proceeds to Step S214.

In Step S214, the reading section 12 reads a document according to the input from the input section 18a and generates target image data.

In Step S216, the communication section 16 transmits the target image data to the information processing device 20. The communication section 16 further transmits a specification signal indicating that one of the first conversion processing section 22a and the second conversion processing section 22b has been specified to the information processing device 20. Through the above, the information processing process by the image reading device 10 ends.

As described above, the image reading device 10 transmits the specification signal indicating that one of the first conversion processing section 22a and the second conversion processing section 22b has been specified together with the target image data of the document to the information processing device 20. Thereafter, a conversion processing section indicated in the specification signal converts the target image data to character code data in the information processing device 20. For example, the information processing device 20 converts the target image data to character code data in a manner as described above with reference to FIG. 2. In the above configuration, the document can be converted to character code data as desired by the user of the image reading device 10.

Note that in a case as described above where the first conversion processing section 22a is indicated in the specification signal from the image reading device 10, the first conversion processing section 22a converts the target image data to character code data while the second conversion processing section 22b does not convert the target image data to character code data. As a result of the second conversion processing section 22b not performing conversion processing, incurrence of an additional expense can be avoided.

As described above, the user of the image reading device 10 is allowed to specify a conversion processing section for conversion processing on the target image data of a document using the image reading device 10. Note that a conversion processing section specified in the image reading device 10 converts target image data to character code data in the above description with reference to FIGS. 7 to 9, which should not be taken to limit the present embodiment. It is possible that a conversion processing section specified in the image reading device 10 converts target image data to character code data for output while a conversion processing section not specified in the image reading device 10 converts the target image data to character code data. For example, the first conversion processing section 22a of the information processing device 20 may convert target image data to character code data regardless of the content of the specification signal from the image reading device 10.

The first conversion processing section 22a in the information processing system 100 according to the present embodiment converts target image data to character code data regardless of the content of the specification signal from the image reading device 10. In a situation in which the first conversion processing section 22a is indicated in the specification signal from the image reading device 10, the first conversion processing section 22a converts target image data to character code data.

Specifically, in a situation in which the specification signal from the image reading device 10 indicates the second conversion processing section 22b, the second conversion processing section 22b converts the target image data OG to the character code data CD2 and outputs the character code data CD2. By contrast, even in a situation in which the specification signal from the image reading device 10 indicates the second conversion processing section 22b, the first conversion processing section 22a also converts the target image data OG to the character code data CD1. However, in this case, the character code data CD1 is not output while the first recognition rate in conversion of the target image data OG to the character code data CD1 is obtained. The storage 27s updates the recognition rate using the first recognition rate in the first conversion processing on the target image data OG. When the first conversion processing section 22a performs conversion processing on the target image data OG, further accurate recognition rate can be obtained without incurring an additional expense.

Figure 10:
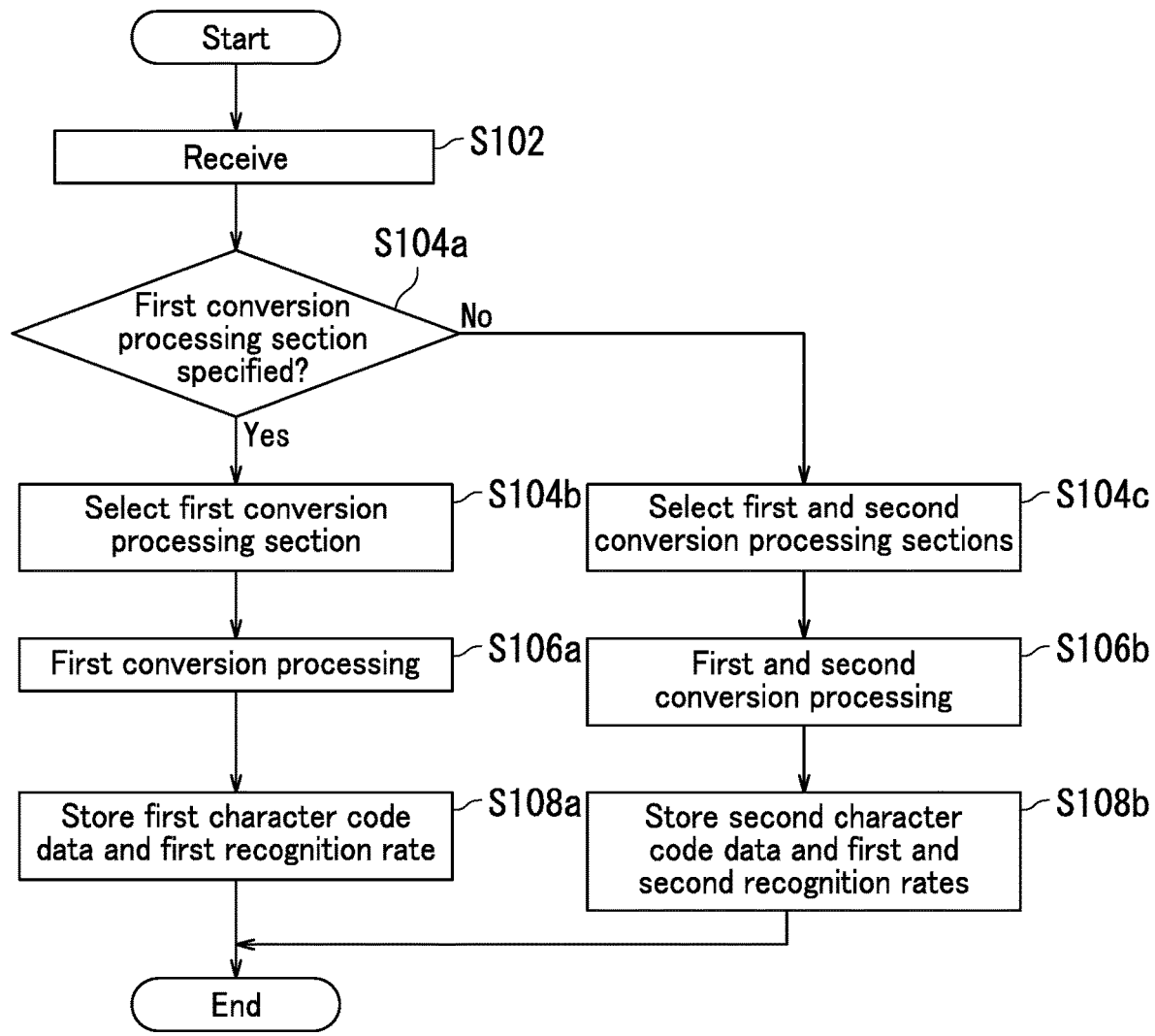
FIG. 10 is a flowchart depicting information processing performed by an information processing device in the information processing system according to the embodiment.

The following describes an information processing method implemented by the information processing device 20 according to the present embodiment with reference to FIG. 10. FIG. 10 is a flowchart depicting the information processing method implemented by the information processing device 20 according to the present embodiment. The flowchart of FIG. 10 is similar to the flowchart described with reference to FIG. 4 in almost all aspects other than that the first conversion processing section 22a converts target image data to character code data regardless of the specification content of the specification signal from the image reading device 10. Duplicate description is therefore omitted in order to avoid redundancy.

First, target image data is received in Step S102. The image reading device 10 generates target image data OG through document reading and transmits the target image data OG to the information processing device 20. The information processing device 20 receives the target image data OG from the image reading device 10.

The selection section 22c determines whether or not the first conversion processing section 22a is indicated in the specification signal in Step S104a. When the first conversion processing section 22a is indicated (Yes in Step S104a), the process proceeds to Step S104b. The selection section 22c selects the first conversion processing section 22a in Step S104b.

Thereafter, the first conversion processing section 22a converts the target image data OG to the character code data CD1 in Step S106a. In this case, the first conversion processing section 22a performs the first conversion processing while the second conversion processing section 22b does not perform the second conversion processing.

The storage 27s then stores the character code data CD1 in Step S108a. Note that the character code data CD1 is output as needed. Thereafter, the process ends.

In a situation in which the first conversion processing section 22a is not indicated (No in Step S104a), the process proceeds to Step S104c. In Step S104c, the selection section 22c selects the second conversion processing section 22b together with the first conversion processing section 22a.

Thereafter, in Step S106b, the first conversion processing section 22a converts the target image data OG to the character code data CD1 while the second conversion processing section 22b converts the target image data OG to the character code data CD2.

The storage 27s then stores the character code data CD2 in Step S108b. Note that the character code data CD2 is output as needed. By contrast, the storage 27s does not store the character code data CD1 and the character code data CD1 is not output. However, the storage 27s stores the first recognition rate in the first conversion processing on the target image data OG. For example, the storage 27s updates the recognition rate in the first conversion processing by the first conversion processing section 22a. The process then ends.

The storage 27s stores the first recognition rate and the second recognition rate therein in the description with reference to FIGS. 7 to 10, which should not be taken to limit the present embodiment. The storage 27s may store a matching rate therein. The matching rate is a rate of matching between the first character code data as a result of conversion by the first conversion processing section 22a and the second character code data as a result of conversion by the second conversion processing section 22b.

Figure 11:
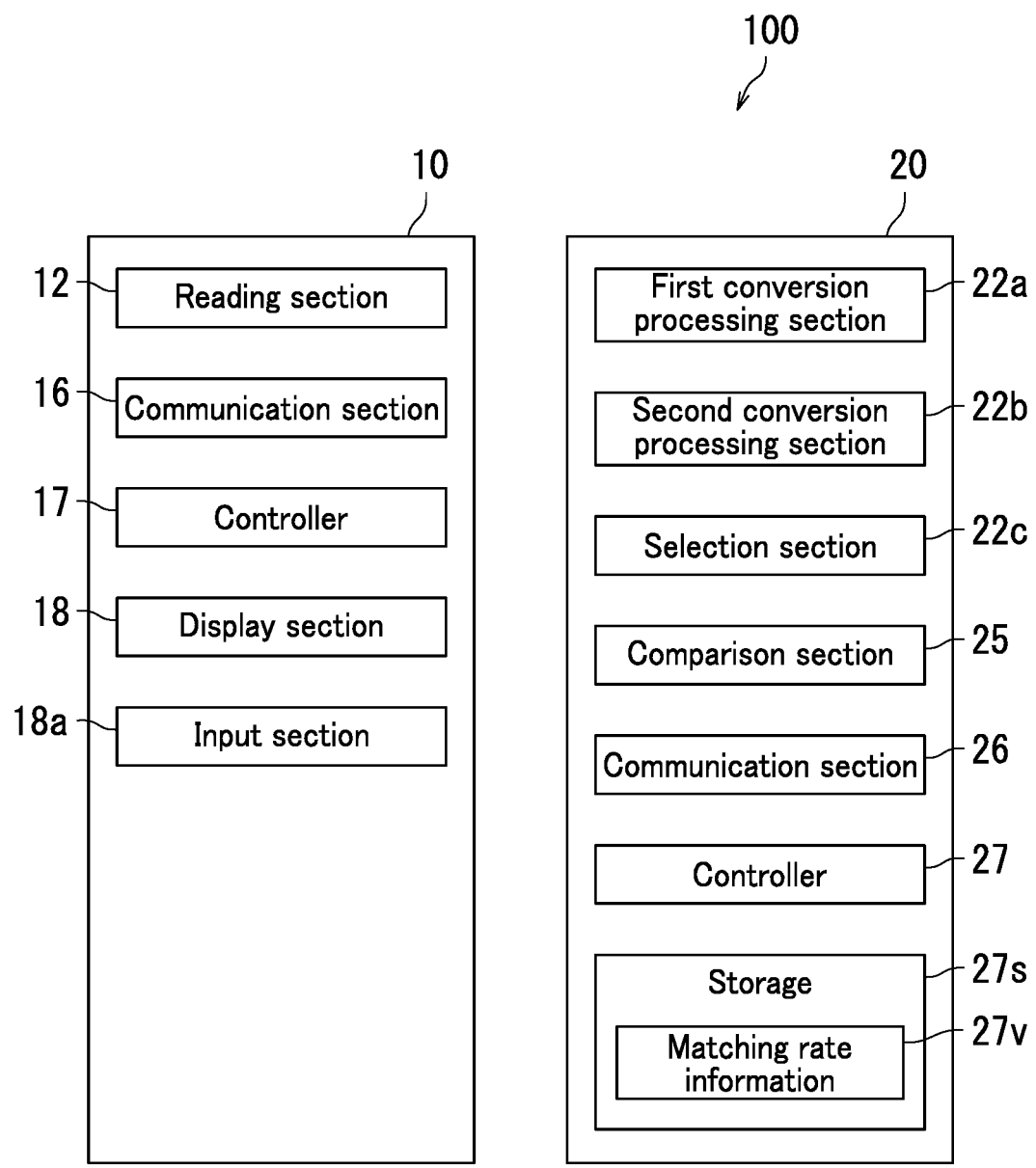
FIG. 11 is a schematic block diagram of an information processing system according to the embodiment.

An information processing system 100 according to the present embodiment will be described next with reference to FIG. 11. FIG. 11 is a schematic diagram of the information processing system 100 according to the present embodiment. The information processing system 100 in FIG. 11 has a configuration similar to that of the information processing system 100 described with reference to FIG. 7 in almost all aspects other than that the information processing device 20 further includes a comparison section 25. Duplicate description is therefore omitted in order to avoid redundancy.

The information processing device 20 further includes a comparison section 25 in addition to the first conversion processing section 22a, the second conversion processing section 22b, the selection section 22c, the communication section 26, the controller 27, and the storage 27s. The comparison section 25 performs comparison between the character code data CD1 and the character code data CD2 upon generation of the character code data CD1 and the character code data CD2. The comparison section 25 generates a matching rate between the character code data CD1 and the character code data CD2 based on a result of comparison. When the character code data CD1 is identical to the character code data CD2, the matching rate is 100%. When the character code data CD1 is completely different from the character code data CD2, the matching rate is 0%.

The storage 27s stores matching rate information 27v therein. The storage 27s may also store therein a threshold for determination as to the matching rate. The matching rate information may be displayed on the display section 18 of the image reading device 10.

FIG. 12A is a schematic diagram of a display screen displayed by the display section 18 upon selection of the workflow 7. As illustrated in FIG. 12A, the display section 18 displays a display screen indicating a block for setting conversion processing information, reading resolutions, document sizes, document orientations, and an output destination of character code data. Note that the display screen illustrated in FIG. 12A is similar to the display screen illustrated in FIG. 8B in almost all aspects other than that the matching rate is displayed as the conversion processing information. Duplicate description is therefore omitted in order to avoid redundancy.

FIG. 12A is a schematic diagram of a display screen displayed by the display section 18 upon selection of the workflow 7. As illustrated in FIG. 12A, the matching rate is displayed as the conversion processing information. The matching rate herein is a rate of matching between the character code data CD1 and the character code data CD2 through reading a document relating to past transportation expense reimbursement. The matching rate in FIG. 12A is 98%.

FIG. 12B is a schematic diagram of a display screen displayed by the display section 18 upon selection of the workflow 1. As illustrated in FIG. 12B, the matching rate is displayed as the conversion processing information. The matching rate herein is a rate of matching between the character code data CD1 and the character code data CD2 through reading a document relating to past bills for the company A. The matching rate in FIG. 12B is 100%. In this case, it is understood that for at least the past bills for the company A, the first conversion processing by the first conversion processing section 22a is sufficient and the second conversion processing by the second conversion processing section 22b is unnecessary. As described above, the user of the image reading device 10 can determine whether or not the second conversion processing section 22b is worth using rather than the first conversion processing section 22a of the information processing device 20 in terms of the matching rate.

As described above, when the matching rate is 100%, it is needless to use the second conversion processing section 22b. Therefore, the display section 18 may display the second conversion processing section 22b in a shaded manner as illustrated in FIG. 12B so that the second conversion processing section 22b is not to be selected. In a situation in which the matching rate is higher than a matching rate threshold, the display section 18 may display the second conversion processing section 22b in a shaded manner.

According to the present embodiment, the user of the image reading device 10 is allowed to specify a conversion processing section for conversion processing on target image data of a document in the image reading device 10. Note that a conversion processing section specified in the image reading device 10 converts target image data to character code data in the description with reference to FIGS. 7 to 9, which should not be taken to limit the present embodiment. It is possible that a conversion processing section specified in the image reading device 10 converts the target image data to character code data for output while a conversion processing section not specified in the image reading device 10 converts the target image data to character code data.

Note that the information processing device 20 includes two conversion processing sections of the first conversion processing section 22a and the second conversion processing section 22b in the description with reference to FIGS. 1 to 12, which should not be taken to limit the present embodiment. Each of the image reading device 10 and the information processing device 20 of the information processing system 100 may include at least one conversion processing section.

Figure 13:
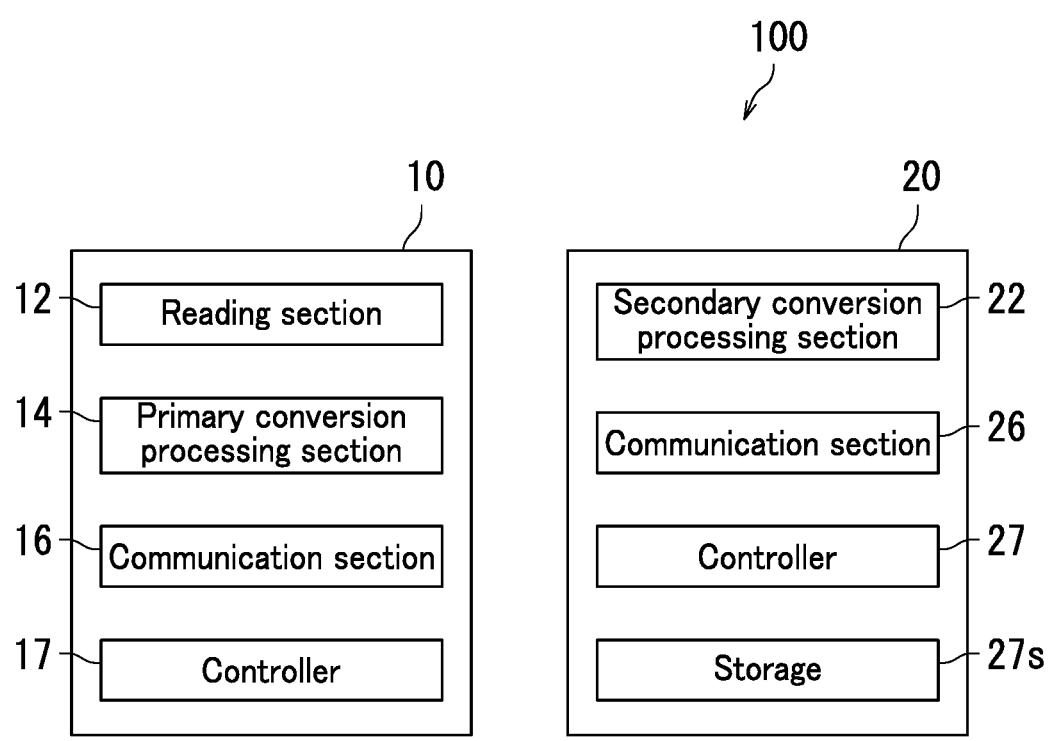
FIG. 13 is a schematic block diagram of an information processing system according to the embodiment.

An information processing system 100 according to the present embodiment will be described next with reference to FIGS. 1 and 13. FIG. 13 is a schematic diagram of the information processing system 100 according to the present embodiment. The information processing system 100 includes an image reading device 10 and an information processing device 20.

The image reading device 10 includes a reading section 12, a primary conversion processing section 14, a communication section 16, and a controller 17. The controller 17 controls the reading section 12, the primary conversion processing section 14, and the communication section 16. The controller 17 includes a processor. The processor may include a central processing unit (CPU). Alternatively, the processor may include a microcomputer. Or, the processor may include an application specific integrated circuit (ASIC).

The reading section 12 is capable of generating image data by document reading. The reading section 12 reads a document and generates target image data OG.

The primary conversion processing section 14 is capable of converting image data to character code data. The primary conversion processing section 14 is capable of converting for example the image data OG to character code data. Note that in the present description, character code data converted by the primary conversion processing section 14 may be referred to as primary character code data or character code data RCD. Also in the present description, conversion processing by the primary conversion processing section 14 may be referred to as primary conversion processing.

Typically, when the primary conversion processing section 14 converts image data to character code data, a recognition rate of the primary conversion processing is also generated. The recognition rate indicates a rate of characters recognized as characters appropriately converted by the primary conversion processing section 14. In a situation in which the recognition rate is high, it is probable that the primary conversion processing is appropriately performed with no error. Also in the present description, a recognition rate of conversion processing by the primary conversion processing section 14 may be referred to as a primary recognition rate.

The communication section 16 communicates with an external electronic device. Here, the communication section 16 transmits the target image data OG to the information processing device 20. When the primary conversion processing section 14 generates the character code data RCD, the communication section 16 transmits the character code data RCD together with the target image data OG to the information processing device 20.

The information processing device 20 includes a secondary conversion processing section 22, a communication section 26, a controller 17, and storage 27s. The controller 27 controls the secondary conversion processing section 22 and the communication section 26. The controller 27 includes a processor. The processor may include a CPU, a microcomputer, or an ASIC.

The secondary conversion processing section 22 is capable of converting image data to character code data. The secondary conversion processing section 22 is capable of converting for example the image data OG to character code data. Note that in the present description, character code data converted by the secondary conversion processing section 22 may be referred to as secondary character code data or character code data OCD. Also in the present description, conversion processing by the secondary conversion processing section 22 may be referred to as secondary conversion processing.

Typically, when the secondary conversion processing section 22 converts image data to character code data, a recognition rate of the secondary conversion processing is also generated. In the present description, a recognition rate of conversion processing by the secondary conversion processing section 22 may be referred to as a secondary recognition rate.

The primary conversion processing section 14 and the secondary conversion processing section 22 each convert image data to character code data. For example, the primary conversion processing section 14 converts specific target image data to Japanese character code data. Similarly, the secondary conversion processing section 22 converts the same target image data to Japanese character code data.

However, even in a case where the target image data is the same and the secondary conversion processing section 22 performs the same type of conversion processing as the primary conversion processing section 14, secondary conversion processing by the secondary conversion processing section 22 is not the same as the conversion processing by the primary conversion processing section 22b and the character code data OCD may not necessarily be identical to the character code data RCD. For example, the secondary conversion processing section 22 performs conversion processing at a normal level and the primary conversion processing section 14 performs conversion processing at a level higher than that of the conversion processing by the secondary conversion processing section 22. In one example, the primary conversion processing section 14 is able to appropriately covert image data that the secondary conversion processing section 22 is not able to convert correctly. In this case, the primary recognition rate is higher than the secondary recognition rate. Alternatively, it is possible that the primary conversion processing section 14 performs conversion processing at a normal level and the secondary conversion processing section 22 performs conversion processing at a level higher than that of the primary conversion processing by the primary conversion processing section 14.

The controller 27 controls the secondary conversion processing section 22 to perform or not to perform the secondary character code conversion on target image data. When the controller 27 does not receive the character code data RCD from the image reading device 10, the controller 27 controls the secondary conversion processing section 22 to convert the target image data OG to the character code data OCD. By contrast, when the controller 27 receives the character code data RCD from the image reading device 10, the controller 27 controls the secondary conversion processing section 22 not to convert the target image data OG to the character code data OCD.

For example, the controller 27 may control the secondary conversion processing section 22 to convert or not to covert target image data in accordance with a prescribed procedure before the information processing device 20 receives the target image data OG. In one example, the controller 27 may select conversion or non-conversion of target image data by the secondary conversion processing section 22 in accordance with a prescribed procedure before the information processing device 20 receives the target image data OG.

Note that the controller 27 may control the secondary conversion processing section 22 to convert the target image data OG to the character code data OCD even in a situation in which the character code data RCD is received. For example, the controller 27 may the cause the secondary conversion processing section 22 to perform the secondary conversion processing in a situation in which a primary recognition rate received from the image reading device 10 does not satisfy a specific condition. In this case, the controller 27 may compare the primary recognition rate and a secondary recognition rate by the secondary conversion processing section 22 to select character code data corresponding to a higher recognition rate.

The storage 27s stores a control program therein. The control program is stored in a non-transitory computer-readable storage medium. The non-transitory computer-readable recording medium includes read-only memory (ROM), random-access memory (RAM), compact disc-ROM (CD-ROM), magnetic tape, a magnetic disc, or an optical data storage device. The controller 27 controls operation of each element of configuration in the information processing device 20 through execution of the control program stored in the storage 27s.

According to the information processing system 100 of the present embodiment, at least one of the primary conversion processing section 14 and the secondary conversion processing section 22 converts the target image data OG to character code data. For example, either the primary conversion processing section 14 or the secondary conversion processing section 22 may be selected based on an expense or charges for use. Alternatively, either the primary conversion processing section 14 or the secondary conversion processing section 22 may be selected based on their recognition rates.

Note that the magnitude correlation between the primary recognition rate and the secondary recognition rate may be fixed regardless of the type of either or both the target image data and the character code data. For example, when the primary recognition rate is higher than the secondary recognition rate regardless of the type of either or both target image data and character code data, performance of the primary conversion processing section 14 is superior to the performance of the secondary conversion processing section 22.

Note that the magnitude correlation between the primary recognition rate and the secondary recognition rate may be changed according to the type of either or both target image data and character code data. For example, in a case where target image data is converted to Japanese character code data, the secondary recognition rate may be higher than the primary recognition rate. Also, in a case where target image data is converted to English character code data, the primary recognition rate may be higher than the secondary recognition rate.

Furthermore, a condition of use of the secondary conversion processing section 22 may differ from a condition of use of the primary conversion processing section 14. For example, the secondary conversion processing section 22 may be useable free of charge while the primary conversion processing section 14 may be useable for a fee. For example, the secondary conversion processing section 22 is usable without license, while the primary conversion processing section 14 is usable under license. Alternatively, a usage fee for the secondary conversion processing section 22 is cheap while a usage fee for the primary conversion processing section 14 is expensive. Alternatively, a usage fee for the secondary conversion processing section 22 is a flat fee while a usage fee for the primary conversion processing section 14 is a usage-based fee.

Note that charges for use of the primary conversion processing section 14 and the secondary conversion processing section 22 may be increased according to the amount of image data processed (amount of use) or fixed regardless of the amount of image data processed (amount of use). For example, charges for use of the primary conversion processing section 14 and the secondary conversion processing section 22 may be fixed for a specific period regardless of the amount of image data processed (amount of use).

Typically, the usage fee for the secondary conversion processing section 22 may not be charged. For example, the secondary conversion processing section 22 may utilize an open source.

The primary conversion processing section 14 may be one for which a usage fee is to be charged. For example, the primary conversion processing section 14 may be software developed by a vendor.

For example, in a case where a relatively less important document is a target, the controller 27 may select, based on a user setting, a conversion processing section for which a low usage fee is set. Alternatively, in a case where a relatively highly important document is a target, the controller 27 may select, based on a user setting, a conversion processing section having a high recognition rate. Furthermore, in a case where the user desires to set a conversion processing section to be selected according to a status, the controller 27 may query the user about a conversion processing section for each conversion processing and select a conversion processing section according to a user instruction. Alternatively, the controller 27 may select a conversion processing section based on a desired setting condition predetermined by the user.

For example, it is possible that the secondary conversion processing section 22 is capable of converting image data to character code data including either or both a number and an alphabet at a high recognition rate but is incapable of converting the image data to another type of character code data at a high recognition rate. Also, the primary conversion processing section 14 may be capable of converting image data to character code data including either or both a number and an alphabet at a high recognition rate. As such, it is possible that the secondary conversion processing section 22 performs insufficient conversion to multibyte characters while the primary conversion processing section 14 performs sufficient convention to multibyte characters.

Note that the secondary conversion processing section 22 preferably acquires a recognition rate of character code data in conversion from image data to character code data. The recognition rate for character code data increases as the number of times of correct conversion from image data to character code data by the secondary conversion processing section 22 increases.

For example, a language described with characters indicated in target image data is the same as a language described with characters accumulated in a database of the primary conversion processing section 22, the recognition rate by the secondary conversion processing section 22 for character code data is high. By contrast, a language described with characters indicated in target image data differs from a language described with characters accumulated in the database of the primary conversion processing section 22, the recognition rate by the secondary conversion processing section 22 for the character code data is low.

For example, the primary conversion processing section 14 is capable of performing conversion processing with high precision compared to the secondary conversion processing section 22, but charges for use of the primary conversion processing section 14 may be higher than charges for use of the secondary conversion processing section 22. In one example, it is possible that charges for use of the second conversion processing section 22b is determined according to an amount of use thereof while only a user of the information processing device 20 is allowed to use the secondary conversion processing section 22 with no limit of use.

The primary conversion processing section 14 and the secondary conversion processing section 22 may each extract as metadata a portion of character code data to which image data has been converted. Furthermore, the character code data itself may be stored or not be stored as a file. In storing the character code data as a file, the extracted metadata may be attached as a file name.

Figure 14:
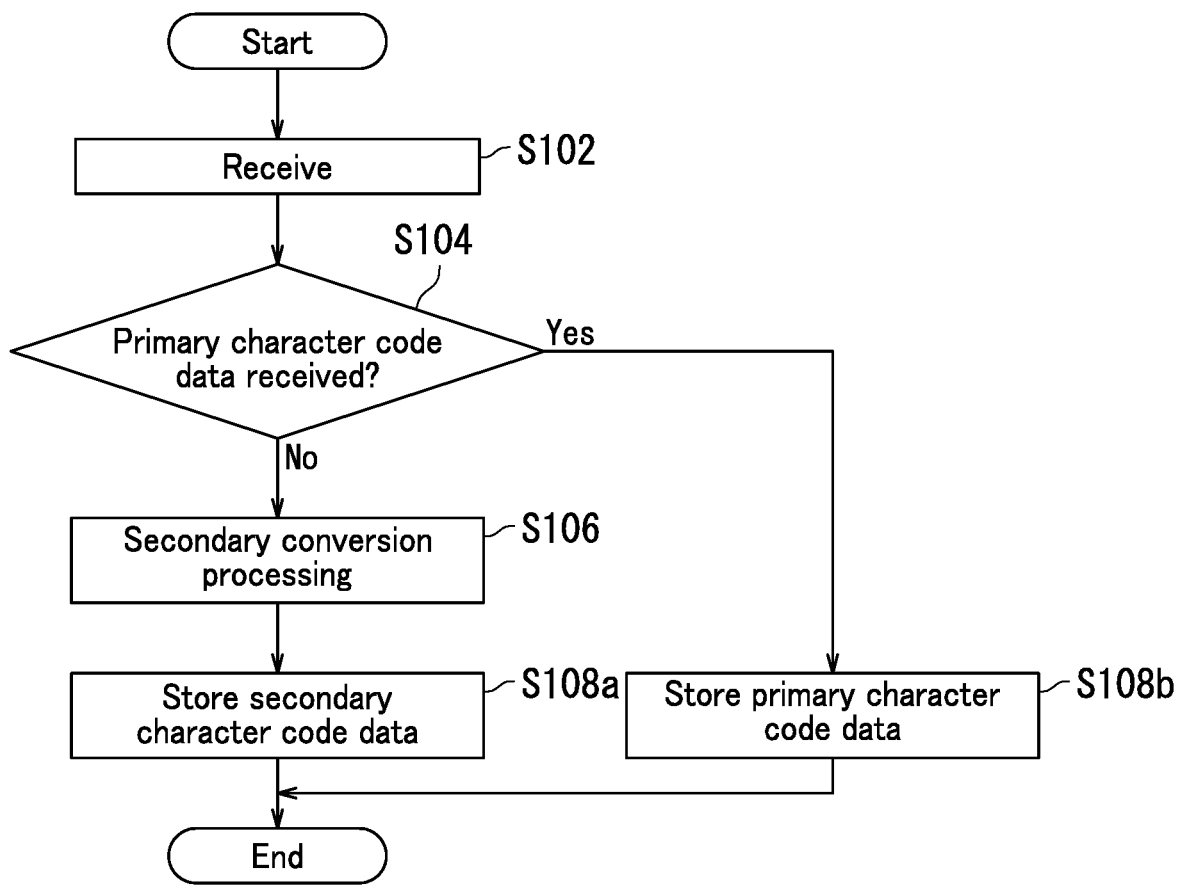
FIG. 14 is a flowchart depicting information processing performed by an information processing device in the information processing system according to the embodiment.

The following describes a flow for information processing performed by the information processing device 20 in the information processing system 100 according to the present embodiment with reference to FIGS. 1, 13, and 14. FIG. 14 is a flowchart depicting the information processing performed by the information processing device 20 in the information processing system 100 according to the embodiment.

The information processing device 20 receives target image data from the image reading device 10 in Step S102. The image reading device 10 reads a document R, generates target image data OG, and transmits the target image data OG to the information processing device 20. The information processing device 20 receives the target image data OG from the image reading device 10. Specifically, the communication section 26 of the information processing device 20 receives the target image data OG from the communication section 16 of the image reading device 10.

The target image data OG is image data generated by reading the document R in the image reading device 10. The reading section 12 of the image reading device 10 generates the target image data OG by reading the document R. Thereafter, the image reading device 10 transmits the target image data OG to the information processing device 20.

As described above, the image reading device 10 is capable of performing the primary conversion processing on the target image data OG. Specifically, the primary conversion processing section 14 of the image reading device 10 may generate the character code data RCD from the target image data OG. As such, the primary conversion processing section 14 may perform the primary conversion processing on the target image data OG.

In the case where the primary conversion processing section 14 performs the primary conversion processing, the image reading device 10 transmits the character code data CD together with the target image data OG to the information processing device 20. Note that the image reading device 10 may transmit the target image data OG and the character code data RCD at the same time to the information processing device 20. Alternatively, the image reading device 10 may transmit the target image data OG and the character code data RCD separately to the information processing device 20.

The information processing device 20 determines in Step S104 whether or not the character code data RCD has been received from the image reading device 10. Specifically, the controller 27 of the information processing device 20 determines whether or not the character code data RCD has been received.

When the character code data RCD has not been received (No in Step S104), the secondary conversion processing section 22 converts the target image data OG to the character code data OCD in Step S106.

The storage 27s then stores the character code data OCD in Step S108a. The storage 27s may store the target image data OG together with the character code data OCD. Further, the storage 27s may store a portion of the character code data OCD as metadata. The process then ends.

When the character code data RCD has been received, (Yes in Step S104), the storage 27s stores the character code data RCD in Step S108b. The storage 27s may store the target image data OG together with the character code data RCD. Further, the storage 27s may store a portion of the character code data RCD as metadata.

Note that when the character code data RCD has been received, the secondary conversion processing section 22 does not perform the secondary conversion processing on the target image data OG to character code data. However, the controller 27 may perform processing other than the secondary conversion processing on the target image data OG. The process then ends.

As described with reference to FIG. 14, the information processing device 20 uses the character code data RCD without performing secondary conversion processing on the target image data OG upon receiving the character code data RCD from the image reading device 10 in the present embodiment. The information processing device 20 converts the target image data OG to the character code data OCD upon not receiving the character code data RCD from the image reading device 10. In the above configuration in the present embodiment, a result of conversion from image data to character code data can be used efficiently.

Note that in the above description with reference to FIGS. 1, 13, and 14, the secondary conversion processing section 22 is capable of converting the target image data OG to one type of character code data, which should not be taken to limit the present embodiment. The secondary conversion processing section 22 may be capable of converting the target image data OG to various types of character code data.

Figure 15:
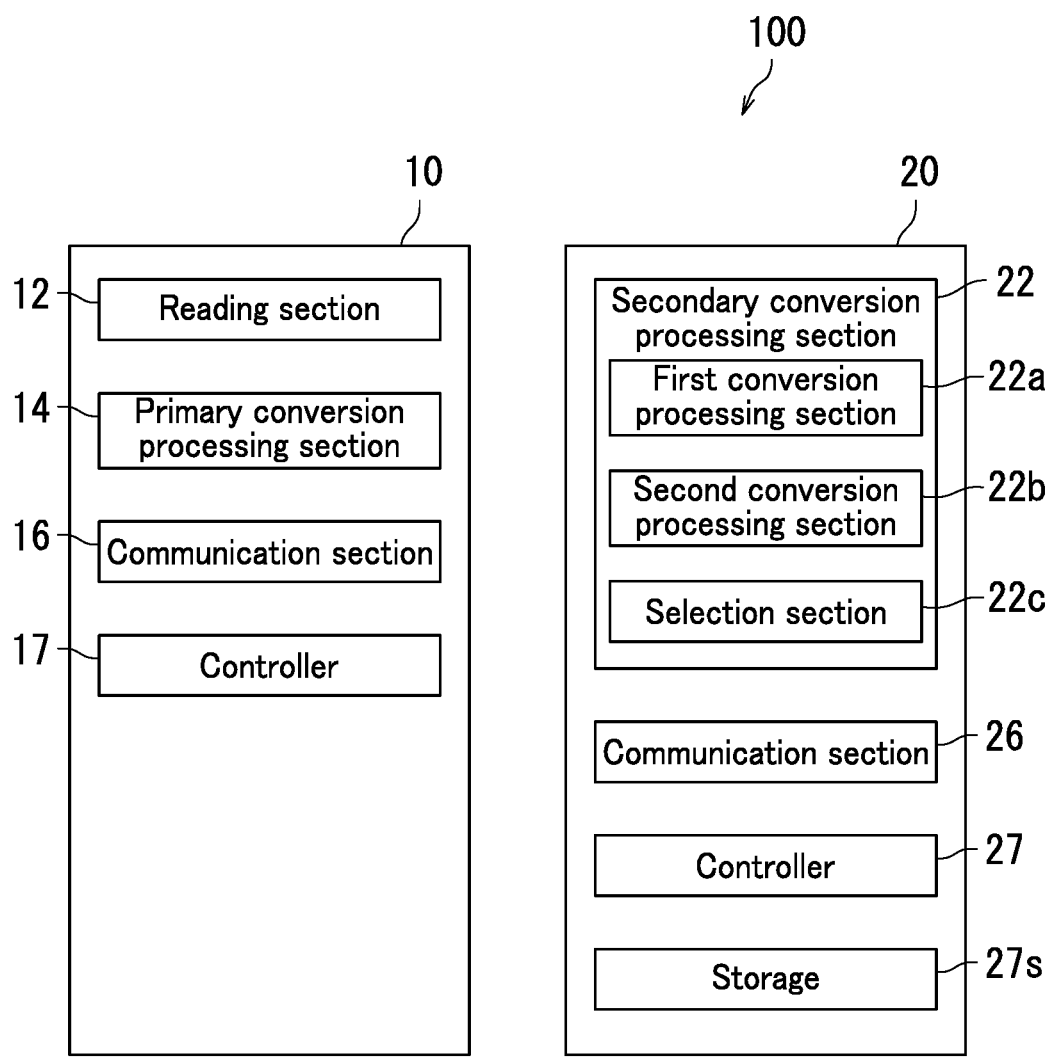
FIG. 15 is a schematic block diagram of an information processing system according to the embodiment.

An information processing system 100 according to the present embodiment will be described next with reference to FIG. 15. FIG. 15 is a schematic diagram of the information processing system 100 according to the present embodiment. The information processing system 100 in FIG. 15 has a configuration similar to that of the information processing system 100 described with reference to FIG. 13 in almost all aspect other than that the secondary conversion processing section 22 includes a first conversion processing section 22a, a second conversion processing section 22b, and a selection section 22c. Duplicate description is therefore omitted in order to avoid redundancy.

The secondary conversion processing section 22 includes a first conversion processing section 22a, a second conversion processing section 22b, and a selection section 22c. The first conversion processing section 22a is capable of converting image data to character code data. The second conversion processing section 22b is capable of converting image data to character code data. Note that conversion processing by the second conversion processing section 22b differs from conversion processing by the first conversion processing section 22a. Further, the conversion processing by the first conversion processing section 22a and the conversion processing by the second conversion processing section 22b differ from the conversion processing by the primary conversion processing section 14.

The first conversion processing section 22a is capable of converting image data to character code data. For example, the first conversion processing section 22a is capable of converting the target image data OG to character code data. Note that in the present description, character code data converted by the first conversion processing section 22a may be referred to as first character code data or character code data CD1. Also in the present description, the conversion processing by the first conversion processing section 22a may be referred to as first conversion processing.

Typically, when the first conversion processing section 22a converts image data to character code data, a recognition rate of the first conversion processing is also generated. In the present description, the recognition rate by the first conversion processing section 22a may be referred to as a first recognition rate.

The second conversion processing section 22b is capable of converting image data to character code data. For example, the second conversion processing section 22b is capable of converting the target image data OG to character code data. In the present description, character code data converted by the second conversion processing section 22b may be referred to as second character code data or character code data CD2. Also in the present description, conversion processing by the second conversion processing section 22b may be referred to as second conversion processing.

When the second conversion processing section 22b converts image data to character code data, a recognition rate of the second conversion processing is also generated. In the present description, the recognition rate by the second conversion processing section 22b may be referred to as a second recognition rate.

Both the first conversion processing section 22a and the second conversion processing section 22b converts image data to character code data. For example, the first conversion processing section 22a converts given target image data to Japanese character code data. Similarly, the second conversion processing section 22b converts the same target image data to Japanese character code data.

However, even in a case where the target image data is the same and the first conversion processing section 22a performs the same type of conversion processing as the second conversion processing section 22b, the conversion processing by the first conversion processing section 22a is not the same as the conversion processing by the second conversion processing section 22b and the character code data CD1 is not identical to the character code data CD2. For example, the first conversion processing section 22a performs conversion processing at a normal level and the second conversion processing section 22b performs conversion processing at a level higher than that of the conversion processing by the first conversion processing section 22a. In one example, the second conversion processing section 22b is able to appropriately convert image data that the first conversion processing section 22a is not able to convert correctly.

The selection section 22c selects which is to convert target image, the first conversion processing section 22a or the second conversion processing section 22b. For example, the selection section 22c may select conversion of the target image data OG by either the first conversion processing section 22a or the second conversion processing section 22b in accordance with a prescribed procedure before the information processing device 20 receives the target image data OG.

Alternatively, the selection section 22c may select conversion of the target image data OG by either the first conversion processing section 22a or the second conversion processing section 22b according to user specification from the image reading device 10 that has generated the target image data OG. For example, the image reading device 10 generates target image data by document reading, and specifies conversion processing by either the first conversion processing section 22a or the second conversion processing section 22b directly before, concurrently with, or directly after transmission of the target image data to the information processing device 20. Thereafter, the selection section 22c may select conversion processing on the target image data by either the first conversion processing section 22a or the second conversion processing section 22b according to specification from the image reading device 10.

At least one of the first conversion processing section 22a and the second conversion processing section 22b converts the target image data OG to character code data based on a result of selection by the selection section 22c. For example, when the selection section 22c selects conversion by the first conversion processing section 22a, the first conversion processing section 22a converts the target image data OG to the character code data CD1. By contrast, when the selection section 22c selects conversion by the second conversion processing section 22b, the second conversion processing section 22b converts the target image data OG to the character code data CD2.

Note that the selection section 22c may select conversion processing by either the first conversion processing section 22a or the second conversion processing section 22b multiple times. For example, it is possible that the selection section 22c selects one of the first conversion processing section 22a and the second conversion processing section 22b first, and then, selects the other one of the first conversion processing section 22a and the second conversion processing section 22b when a result of conversion by the selected conversion processing section does not satisfy a specific condition.

Figure 16:
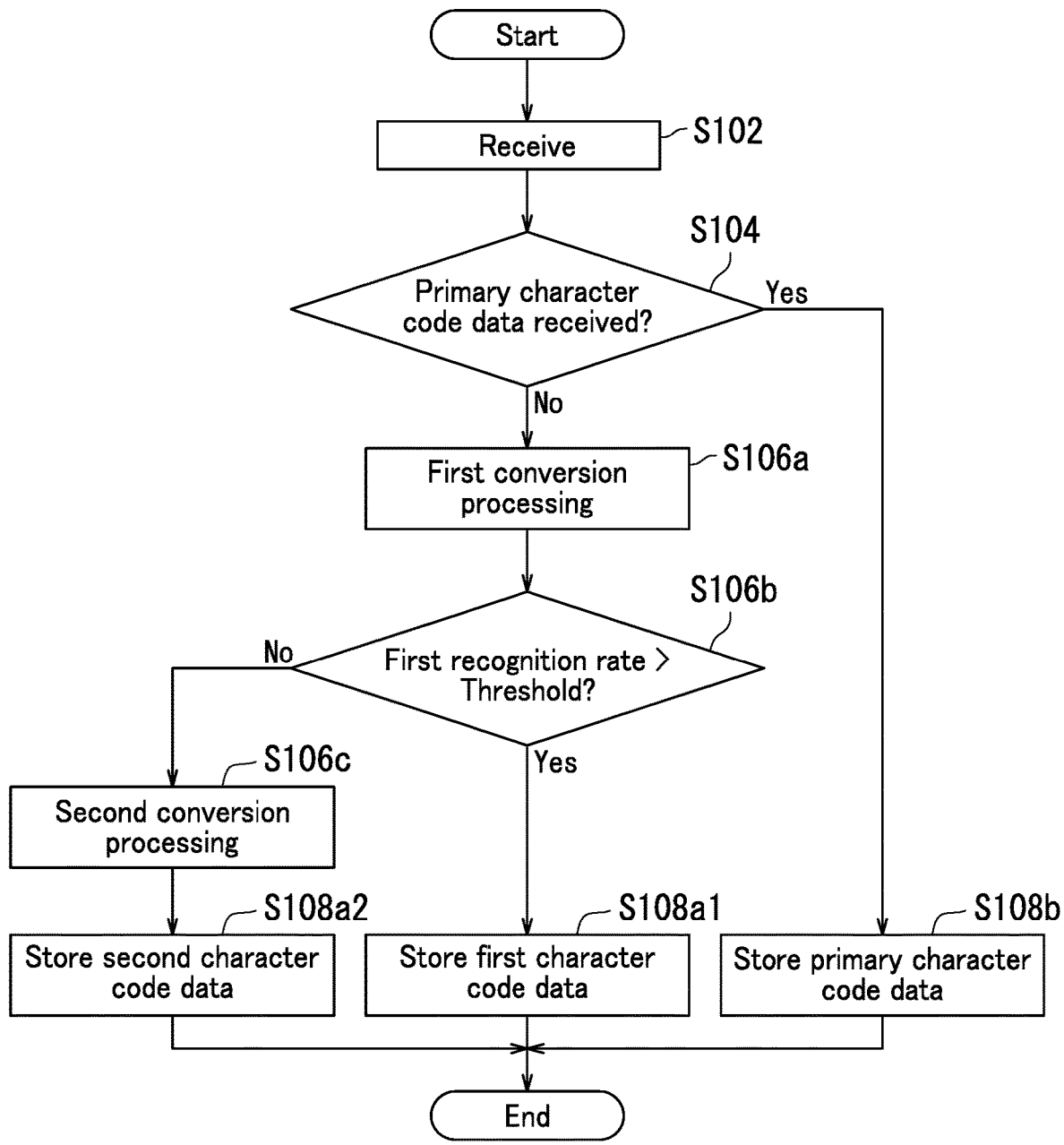
FIG. 16 is a flowchart depicting information processing performed by an information processing device in the information processing system according to the embodiment.

The following describes a flow of information processing performed by the information processing device 20 in the information processing system 100 according to the present embodiment with reference to FIGS. 1, 15, and 16. FIG. 16 is a flowchart depicting the information processing performed by the information processing device 20 in the information processing system 100 according to the present embodiment. The flowchart of FIG. 16 is the same as the flowchart of the information processing performed in the information processing system 100 described with reference to FIG. 14 in almost all aspects other than inclusion of Steps S106a to 106c, 108a1, and 108a2. Duplicate description is therefore omitted in order to avoid redundancy.

When character code data corresponding to the target image data OG has not been received from the image reading device 10 (No in Step No), the first conversion processing section 22a converts the target image data OG to the character code data CD1 in Step S106a. In conversion, the first recognition rate of the conversion processing by the first conversion processing section 22a is acquired.

Thereafter, the information processing device 20 determines whether or not the first recognition rate is higher than a threshold in Step S106b. Specifically, the controller 27 of the information processing device 20 compares the first recognition rate to the threshold to determine whether or not first recognition rate is higher than the threshold.

When it is determined that the first recognition rate threshold is higher than the threshold (Yes in Step S106b), the process proceeds to Step S108a1. The storage 27s stores the character code data CD1 in Step S108a1.

When it is determined that the first recognition rate is not higher than the threshold (No in Step S106b), the second conversion processing section 22b converts the target image data OG to the character code data CD2 in Step S106c. The process then proceeds to Step S108a2. Note that the storage 27s stores the character code data CD2 in Step S108a2. Steps thereafter are the same as those described with reference to FIG. 14, and therefore, description thereof is omitted.

As described above, according to the present embodiment described with reference to FIG. 16, character code data having a recognition rate higher than the threshold or character code data having further higher recognition rate can be generated through conversion by multiple conversion processing sections even when the information processing device 20 has not receive character code data from the image reading device 10. Thus, further precise character code data can be utilized.

Note that in conversion on target image data by any of the primary conversion processing section 14, the secondary conversion processing section 22, the first conversion processing section 22a, and the second conversion processing section 22b, corresponding one(s) of the primary conversion processing section 14, the secondary conversion processing section 22, the first conversion processing section 22a, and the second conversion processing section 22b may perform conversion processing on the entirety of the target image data. Alternatively, the corresponding one(s) of the primary conversion processing section 14, the secondary conversion processing section 22, the first conversion processing section 22a, and the second conversion processing section 22b may perform conversion processing on a specific region of the target image data. In this case, the specific region is preferably designated in advance.

Figure 17:
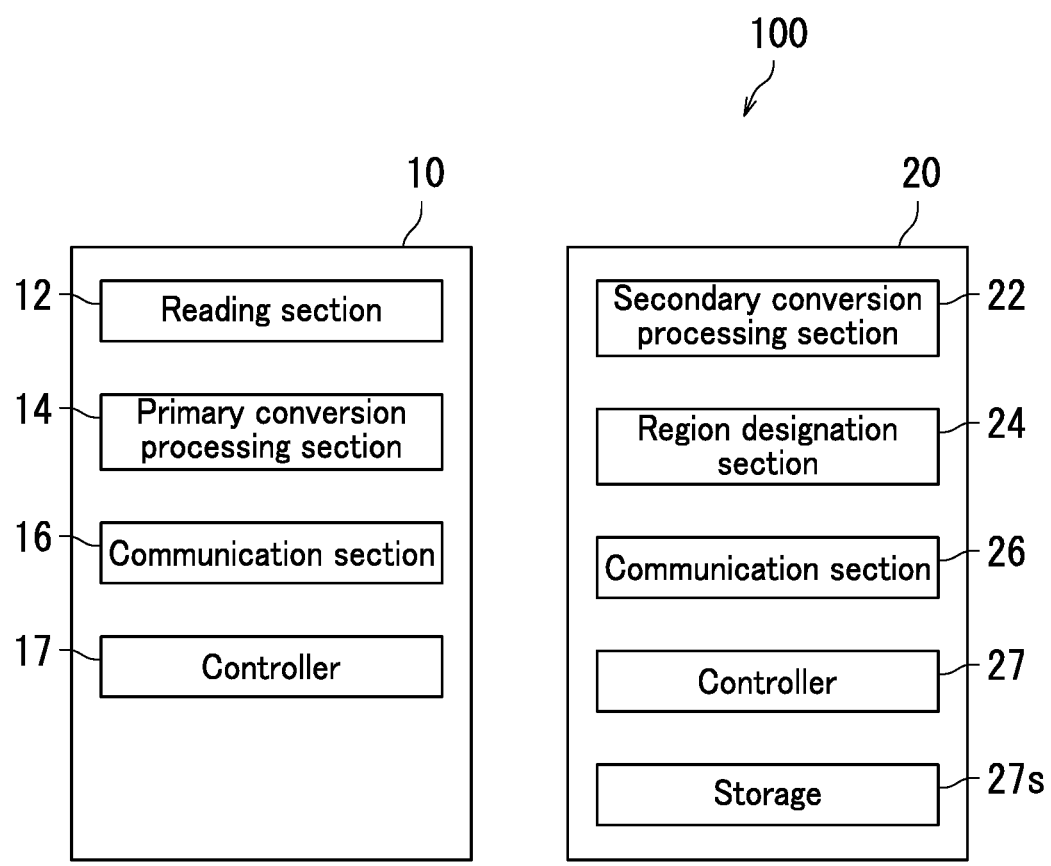
FIG. 17 is a schematic block diagram of an information processing system according to the embodiment.

An information processing system 170 according to the present embodiment will be described next with reference to FIG. 17. FIG. 17 is a schematic diagram of the information processing system 100. The information processing system 100 in FIG. 17 has a configuration similar to that of the information processing system 100 described with reference to FIG. 13 in almost all aspects other than that the information processing device 20 further includes a region designation section 24. Duplicate description is therefore omitted in order to avoid redundancy.

The information processing device 20 includes a region designation section 24 in addition to the secondary conversion processing section 22, the communication section 26, the controller 27, and the storage 27s. The region designation section 24 designates a target region of target image data that is to be subjected to conversion processing. Typically, the information processing device 20 receives the target image data on a page-by-page basis of a document. The region designation section 24 designates a target region to be subjected to conversion processing for each target image data corresponding to a page of the document.

The region designation section 24 may designate a target region to be subjected to conversion processing for every target image data received from the image reading device 10. Alternatively, the region designation section 24 may designate a target region to be subjected to conversion processing according to target image data. For example, the region designation section 24 may designate a target region of target image data that is to be subjected to conversion processing based on a designation signal from the image reading device 10.

For example, when a target region to be subjected to conversion processing is designated, the secondary conversion processing section 22 converts the designated target region of the target region in the target image data to a character code.

Note that document reading by the image reading device 10 may not generate identical image data even when the same document is read. For example, in a case of document reading by the image reading device 10 using an auto document feeder (ADF), generated image data may differ from each other according to a reading state. For the above reason, it is possible that a specific reference mark is provided on a document and the information processing device 20 designates a target region of target image data by referring to the reference mark as a reference.

Figure 18:
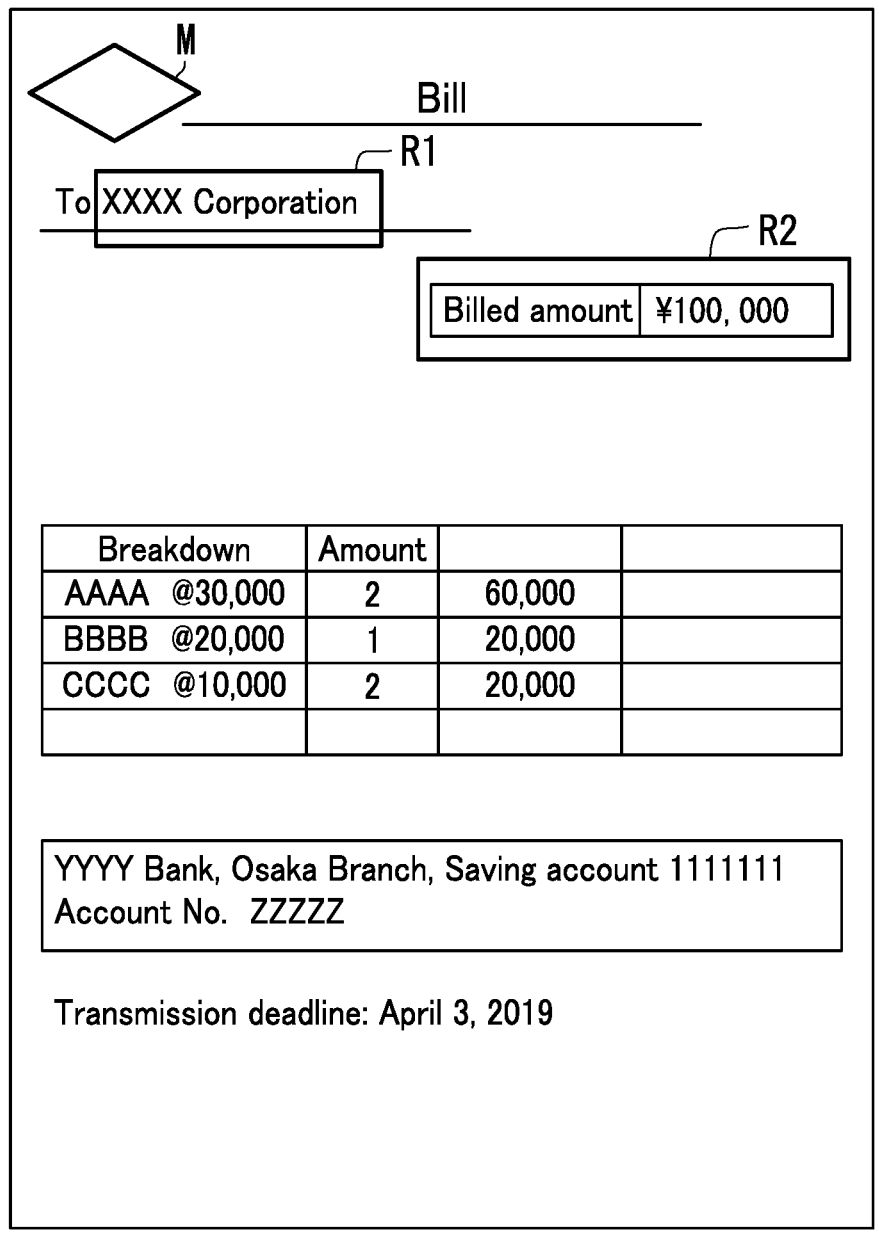
FIG. 18 is a schematic diagram illustrating image data having a designated region in the information processing system according to the embodiment.

The following describes region designation performed by the information processing device 20 in the information processing system 100 according to the present embodiment with reference to FIGS. 17 and 18. FIG. 18 is a schematic diagram of target image data having a designated region. Here, the document is a bill and the target image data is generated by reading the bill.

As illustrated in FIG. 18, regions R1 and R2 are designated in the target image data. The region R1 is designated for a billing address of the bill. The region R2 is designated for a billing amount of the bill.

When the secondary conversion processing section 22 of the information processing device 20 performs conversion processing on the region R1, character code data indicating the billing address can be generated. Also, when the secondary conversion processing section 22 performs conversion processing on the region R2, character code data indicating the billing amount can be generated.

Note that the bill that is a document bears a reference mark M. Therefore, the region designation section 24 can set the regions R1 and R2 for the target image data by referring to the reference mark M. In the above configuration, a specific region can be converted without failure even if image data may vary to some extent in document reading.

Note that in designation of a target region of target image data to be subjected to conversion processing, a result of conversion processing on the target region may make no sense in practice when a read document differs from a document including to a preset target region. For example, when conversion processing by the secondary conversion processing section 22 on a target region designated by the region designation section 24 results in a low recognition rate, a document from which the target image data has been generated may not be in a specific format. In view of the foregoing, it is possible that the storage 27s separately stores character code data having a low recognition rate and character code data having a high recognition rate and the information processing device 20 outputs only the character code data having the high recognition rate.

The information processing device 20 includes the region designation section 24 in the above description with reference to FIGS. 17 and 18, which should not be taken to limit the present embodiment. It is possible that the image reading device 10 includes a region designation section having a function similar to that of the region designation section 24 and a specific target region of image data of a document is converted to character code data in the image reading device 10.

Furthermore, a process flow (workflow) for image data generated in the image reading device 10 may be set in the image reading device 10. For example, workflow setting can differentiate folders in which character code data are stored according to documents.

In one example, through pieces of target image data being generated by causing the image reading device 10 to read a plurality of documents describing pieces of personal information together with respective personal IDs, pieces of electronic data corresponding to the pieces of personal information described in the documents can be individually stored in folders created for the respective personal IDs.

Furthermore, when storage sites are set for pieces of target image data generated by reading a plurality of bills each indicating a billing address, a bill number, a billing item, and a billing amount in the image reading device 10 according to a workflow, pieces of character code data corresponding to billing-associated information described in a plurality of documents can be individually stored in the folders created on a basis of billing address by billing address.

The controller 17 causes the primary conversion processing section 14 to generate the character code data RCD in accordance with the prescribed procedure in the description with reference to FIGS. 1 and 13 to 18, which should not be taken to limit the present embodiment. The primary conversion processing section 14 may generate the character code data RCD according to user specification.

Figure 19:
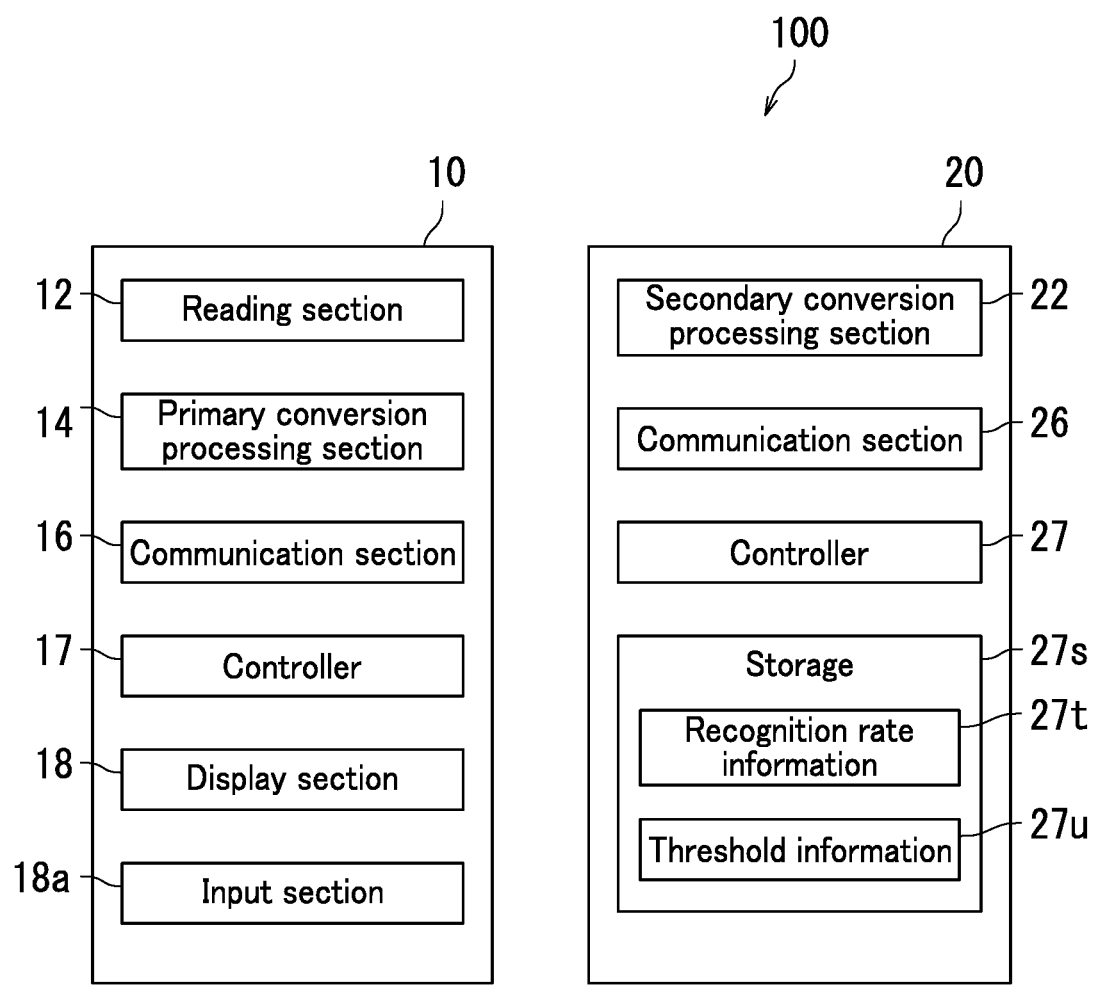
FIG. 19 is a schematic block diagram of an information processing system according to the embodiment.

An information processing system 100 according to the present embodiment will be described next with reference to FIG. 19. FIG. 19 is a schematic diagram of the information processing system 100. The information processing system 100 includes an image reading device 10 and an information processing device 20. The information processing system 100 in FIG. 19 has a configuration similar to that of the information processing system 100 described with reference to FIG. 13 in almost all aspects other than that the image reading device 10 further includes a display section 18 and an input section 18a. Duplicate description is therefore omitted in order to avoid redundancy.

The image reading device 10 includes a display section 18 and an input section 18a in addition to the reading section 12, the communication section 16, and the controller 17. The controller 17 controls the reading section 12, the communication section 16, the display section 18, and the input section 18a.

The display section 18 includes a display. For example, the display includes a liquid-crystal display or an organic luminescent display.

The input section 18a receives input of a user instruction. The input section 18a includes a keyboard and a mouse. Alternatively, the input section 18a may include a touch sensor. Note that the display section 18 and the input section 18a may be integrated into a touch panel.

The input section 18a receives input of information for specifying a conversion processing section that is to convert the target image data OG generated by document reading. The user is allowed to specify, through the input section 18a, conversion processing so that the primary conversion processing section 14 of the image processing device 10 performs conversion processing on the target image data OG.

Alternatively, the user is allowed to specify, through the input section 18a, the conversion processing so that the secondary conversion processing section 22 of the information processing device 20 performs conversion processing on the target image data OG. In this case, the communication section 16 may transmit to the communication section 26 of the information processing device 20 a specification signal indicating that the secondary conversion processing section 22 has been specified. Transmission of the specification signal may be performed directly before, concurrently with, or directly after transmission of the target image data OG.

The information processing device 20 includes the secondary conversion processing section 22, the communication section 26, the controller 17, and the storage 27s. The storage 27s stores therein recognition rate information 27t and threshold information 27u.

The recognition rate information 27t contains a recognition rate of each type of conversion processing. Specifically, the recognition rate information 27t separately contains a secondary recognition rate by the primary conversion processing section 14 and a secondary recognition rate by the secondary conversion processing section 22. Note that it is possible that the primary recognition rate is stored in the storage 27s as the recognition rate information 27t while the primary recognition rate is stored in the image reading device 10.

Furthermore, the recognition rate information 27t preferably contains a recognition rate for each workflow. In this case, it is highly probable that determination using a past recognition rate is appropriate because the format of the document is the same as a past document.

Preferably, the threshold information 27u separately contains a threshold for each workflow. For example, in a case of conversion processing on many numbers described in a document, the threshold may be low. Alternatively, in a case of conversion processing on many sentences described in a document, the threshold is preferably high. As described above, the threshold used may be differentiated according to a type of characters describe in a document. It is possible that threshold information for the primary conversion processing is stored in the storage 27s as the threshold information 27u while threshold information for the primary conversion processing is stored in the image reading device 10.

According to the present embodiment, the image reading device 10 is capable of selecting a conversion processing section to perform conversion on image data generated by document reading. In the above configuration, the user of the image reading device 10 can determine according to user's desire which conversion processing section is to perform conversion processing on image data generated by document reading.

The image reading device 10 preferably displays information about conversion processing to the user before specification as to which conversion processing section is to perform its conversion processing. The display section 18 displays information about conversion processing before selection of either the primary conversion processing or the secondary conversion processing.

In this case, preferably, the image reading device 10 reads out information about conversion processing from the information processing device 20 before the display section 18 displays the information about the conversion processing. The communication section 16 of the image reading device 10 requests the communication section 26 of the information processing device 20 to transmit the recognition rate information 27t stored in the storage 27s. The communication section 26 transmits the recognition rate information 27t to the communication section 26 in response to the request from the communication section 16. Accordingly, the display section 18 can display the recognition rate information 27t.

Figure 20A:
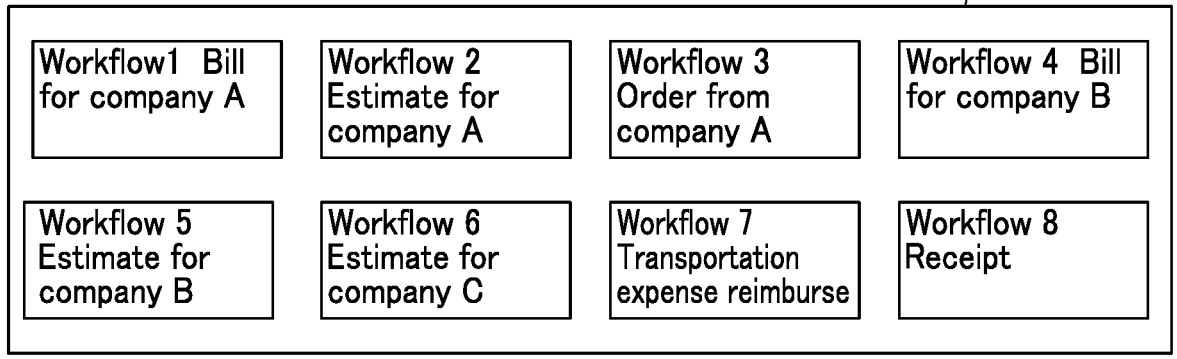
FIGS. 20A to 20C are each a schematic diagram of a display screen on a display section of an image reading device in the information processing system according to the embodiment.
Figure 20B:
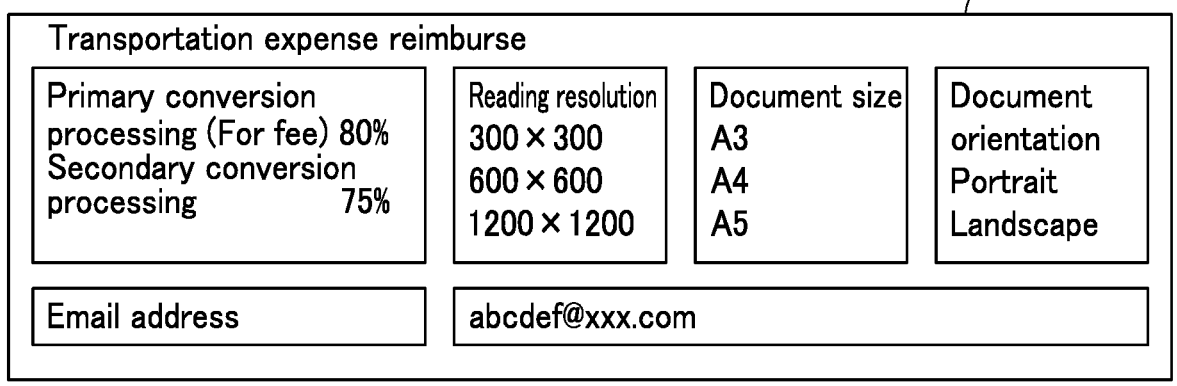
Figure 20C:
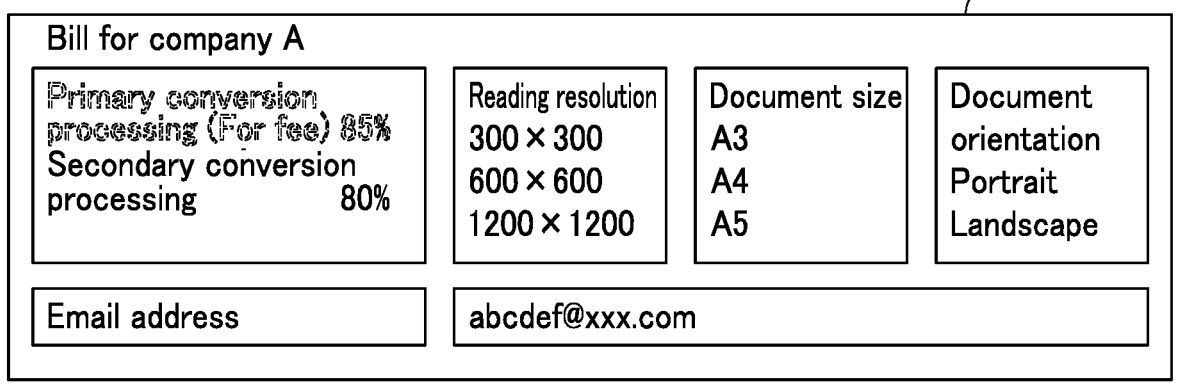

The following describes conversion processing section specification performed in the image reading device 10 according to the present embodiment with reference to FIGS. 1, 13, 19, and 20A to 20C. FIGS. 20A to 20C are each a schematic diagram of a display screen displayed by the display section 18 of the image reading device 10.

FIG. 20A is a schematic diagram of a display screen displayed by the display section 18 at a start of reading and conversion processing for a document R. As illustrated in FIG. 20A, the display screen displayed by the display section 18 displays a plurality of blocks. The display section 18 displays 4 blocks arranged in a left-right direction in an upper part of the display screen and 4 blocks arranged in the left-right direction in a lower part thereof, that is, displays 8 blocks in total. "Bill for company A" is indicated as a workflow 1 in an upper left end block. When the user selects this block through the input section 18a, the communication section 16 of the image reading device 10 reads out information relating to a "bill for the company A" from the storage 27s of the information processing device 20 through communication with the communication section 26 of the information processing device 20, and displays the read information on the display screen displayed by the display section 18.

Note that respective blocks corresponding to a workflow 2, a workflow 3, and a workflow 4 are displayed, likewise the upper left end block, from left to right in the stated order in the upper part of the display screen displayed by the display section 18 as illustrated in FIG. 20A. The workflow 2 corresponds to "Bill for company A". The workflow 3 corresponds to "Order from company A". The workflow 4 corresponds to "Bill for company B".

Furthermore, respective blocks corresponding to a workflow 5, a workflow 6, a workflow 7, and a workflow 8 are displayed from left to right in the stated order in the lower part of the display screen displayed by the display section 18. The workflow 5 corresponds to "Estimate for company B". The workflow 6 corresponds to "Estimate for company C". The workflow 7 corresponds to "Transportation expense reimbursement". The workflow 8 corresponds to "Receipt".

For example, in order to read a document relating to transportation expense reimbursement, the user of the image reading device 10 selects the block of the workflow 7 through the input section 18a. Upon selection of the block of the workflow 7, the communication section 16 reads out a recognition rate relating to transportation expense reimbursement stored in the storage 27s of the information processing device 20 through the communication section 26 of the information processing device 20. The display section 18 of the image reading device 10 displays the read recognition rate on the display screen.

FIG. 20B is a schematic diagram of a display screen displayed by the display section 18 upon selection of the workflow 7. As illustrated in FIG. 20B, the display section 18 displays a display screen indicating a block for setting conversion processing information, reading resolutions, document sizes, document orientations, and an output destination of character code data.

The conversion processing information indicates selectable conversion processing sections, their fees, and their recognition rates. Here, the information processing device 20 includes the primary conversion processing section 14 for which a fee is charged for each use and the secondary conversion processing section 22 for which no fees are charged for each use. Therefore, the display section 18 displays the primary conversion processing section 14 and the secondary conversion processing section 22 as the conversion processing information and "For fee" is indicated beside the primary conversion processing section 14. The conversion processing information includes an average recognition rate in reading a document relating to transportation expense reimbursement that the primary conversion processing section 14 and the secondary conversion processing section 22 have read in the past. Note that the average recognition rate may be an average recognition rate of all documents relating to transportation expense reimbursement read in the past. Alternatively, the average recognition rate may be an average recognition rate of documents each relating to transportation expense reimbursement for a past one month.

In FIG. 20B, the average recognition rate by the primary conversion processing section 14 is 80% while the average recognition rate by the secondary conversion processing section 22 is 75%.

The user of the image reading device 10 is allowed to select the primary conversion processing section 14 or the secondary conversion processing section 22 while viewing the conversion processing information. For example, the user can select the primary conversion processing by touching a region corresponding to the primary conversion processing section 14. The user can also select the secondary conversion processing by touching a region corresponding to the secondary conversion processing section 22.

The display section 18 displays a plurality of reading resolutions as reading resolution candidates. Examples of the reading resolution candidates include 300×300, 600×600, and 1200×1200. The user of the image reading device 10 is allowed to select a reading resolution from among the displayed reading resolutions. For example, the user can select 300×300 as a reading resolution of the reading section 12. In reading, the reading section 12 reads a document with a selected reading resolution and generates target image data. Thereafter, the target image data is transmitted to the communication section 26 of the information processing device 20 from the communication section 16.

The display section 18 displays document size candidates. Examples of the document size candidates herein include A3, A4, and A5. The user of the image reading device 10 selects a document size from among the document size candidates. For example, in a case of the document size being A4, the user selects A4 as the document size. In reading, the reading section 12 reads a document by the selected size and generates target image data.

The display section 18 displays document orientations. The orientations of the document herein include a portrait orientation and a landscape orientation. In a case where the orientation of a document is the portrait orientation, a longitudinal direction of the document is set so as to extend in a main scanning direction of the reading section 12. In a case where the orientation of a document is the landscape orientation, a longitudinal direction of the document is set so as to extend in a sub-scanning direction of the reading section 12. For example, in a situation in which a document is arranged so that the longitudinal direction thereof extends in the main scanning direction, the user selects the document orientation to the portrait orientation. In reading, the reading section 12 reads a region of the document in the selected orientation by the selected size, and generates target image data.

The display section 18 displays an output destination of character code data. The character code data converted from the target image data in the information processing device 20 is transmitted to a specified output destination. The character code data herein is output to a specific address via an email.

As described above, it is possible that no fee is charged according to an amount of use of the secondary conversion processing section 22 in the information processing device 20 while a fee is charged according to an amount of use of the primary conversion processing section 22b. In this case, for the sake of suppressing an increase in cost, when the past recognition rates by the secondary conversion processing section 22 are relatively high, it is highly probable that use of the secondary conversion processing section 22 for conversion processing on image data of the document of this time results in a relatively high recognition rate. Therefore, the display section 18 may display the primary conversion processing section 14 in a shaded manner so that the primary conversion processing section 14 is not to be selected.

FIG. 20C is a schematic diagram of a display screen displayed by the display section 18 upon selection of the workflow 1. FIG. 20C is the same as FIG. 20B in almost all aspects except the selected workflow and the average recognition rates, and therefore, description of overlapped is omitted.

In FIG. 20C, the average recognition rate by the primary conversion processing section 14 is 85% while the average recognition rate by the secondary conversion processing section 22 is 80%. As described above, the average recognition rate by the secondary conversion processing section 22 is relatively high for "Bill for company A" in the workflow 1. Therefore, it is highly probable that image data of a document can be converted to character data at a high recognition rate by the secondary conversion processing section 22 without using the primary conversion processing section 14. For the reason as above, the display section 18 displays the primary conversion processing section 14 in a shaded manner. Thus, the user of the image reading device 10 can prevent incurrence of expense through selection of the secondary conversion processing section 22 rather than the primary conversion processing section 14.

Figure 21:
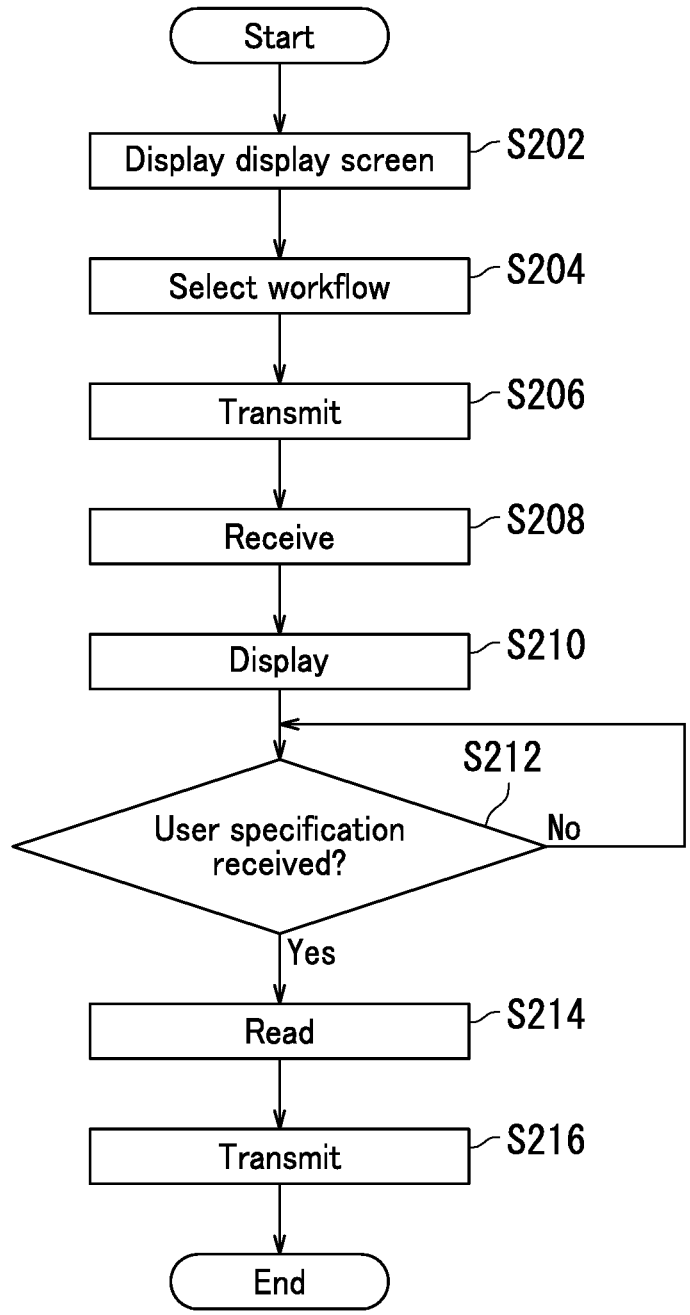
FIG. 21 is a flowchart depicting information processing performed by the image reading device in the information processing system according to the embodiment.

The following describes an information processing method implemented by the image reading device 10 according to the present embodiment with reference to FIGS. 1 and 19 to 21. FIG. 21 is a flowchart depicting the information processing method implemented by the information processing device 10 according to the present embodiment.

First, the image reading device 10 displays a display screen for document reading and conversion processing in Step S202. Specifically, when the user of the image reading device 10 performs input on the input section 18a for starting reading and conversion processing, the display section 18 displays a display screen for reading and conversion processing. For example, the display section 18 displays the display screen illustrated in FIG. 20A.

The user of the image reading device 10 selects a specific workflow from among those displayed on the display screen for reading and conversion processing in Step S204.

In step S206, the communication section 16 transmits a request to read out information about the specific workflow to the information processing device 20.

In Step S208, the communication section 16 receives the information about the specific workflow from the information processing device 20. For example, the communication section 16 receives an average recognition rate for the specific workflow.

In Step S210, the display section 18 displays information about the specific workflow. For example, the display section 18 displays the display screen illustrated in FIG. 20B.

In Step S212, the controller 17 determines whether or not a user specification about conversion processing has been input to the input section 18a. When it is determined that the input section 18a has not receive input (No in Step S212), the process returns to Step S212 and waits for input to the input section 18a.

When the controller 17 determines that the input section 18a has received input (Yes in Step S212), the process proceeds to Step S214.

In Step S214, the reading section 12 reads a document according to the input from the input section 18a and generates target image data. Furthermore, when the primary conversion processing is selected at the input, the primary conversion processing section 14 performs the primary conversion processing and generates the character code data RCD from the target image data OG.

In Step S216, the communication section 16 transmits the target image data OG to the information processing device 20. Furthermore, when the character code data RCD is generated, the communication section 16 transmits the character code data RCD together with the target image data OG to the information processing device 20. Through the above, the information processing method by the image reading device 10 ends.

As described above, the image reading device 10 is capable of specifying the primary conversion processing or the secondary conversion processing. Thereafter, in a case where the character code data RCD is not transmitted, the target image data OG is converted to the character code data OCD in the information processing device 20. For example, the information processing device 20 converts target image data to character code data in a manner as described above with reference to FIG. 13. In the above configuration, a document can be converted to character code data according to a desire of the user of the image reading device 10.

The storage 27s stores therein the primary recognition rate and the secondary recognition rate in the above description with reference to FIGS. 19 to 21, which should not be taken to limit the present embodiment. The storage 27s may store therein a matching rate between the character code data RCD as a result of conversion by the primary conversion processing section 14 and the character code data OCD as a result of conversion by the secondary conversion processing section 22.

Figure 22:
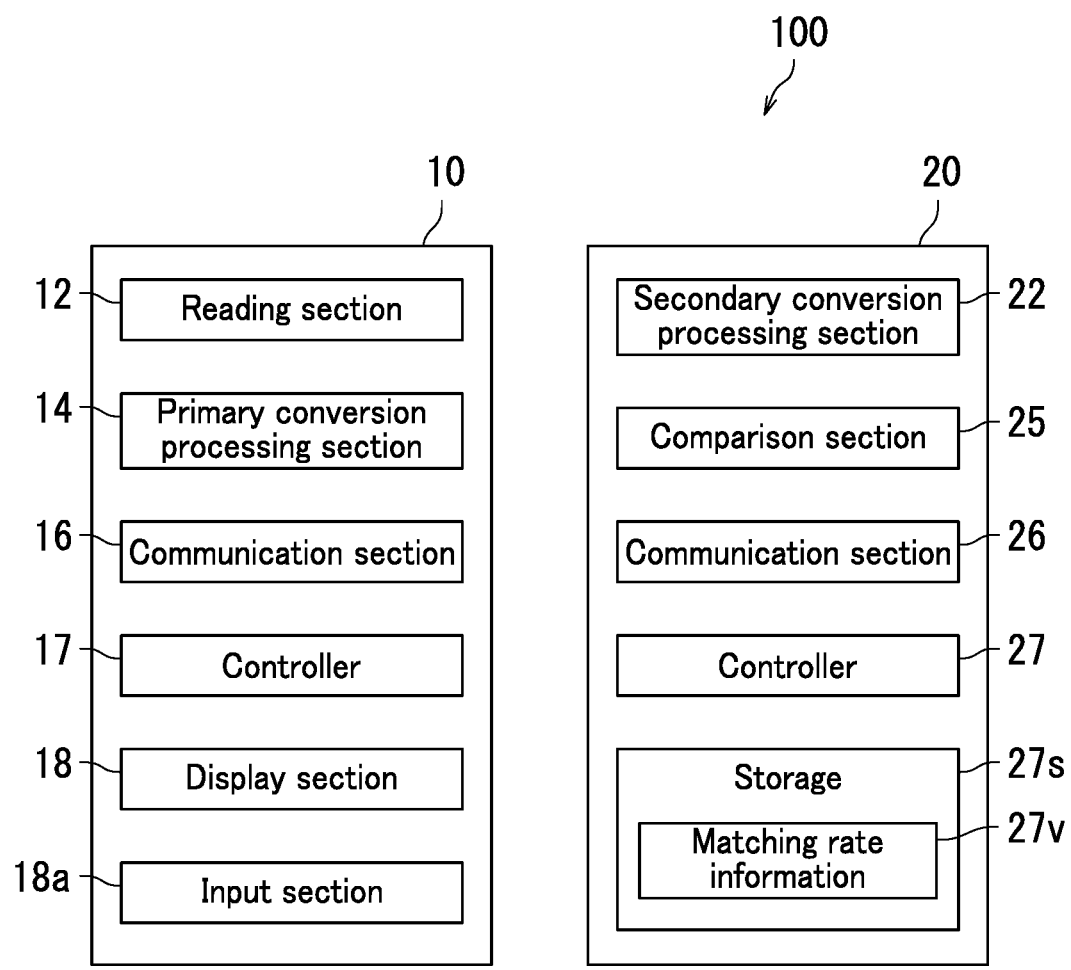
FIG. 22 is a schematic block diagram of an information processing system according to the embodiment.

An information processing system 100 according to the present embodiment will be described next with reference to FIG. 22. FIG. 22 is a schematic diagram of the information processing system 100 according to the present embodiment. The information processing system 100 in FIG. 22 has a configuration similar to that of the information processing system 100 described with reference to FIG. 19 in almost all aspects other than that the information processing device 20 further includes a comparison section 25. Duplicate description is therefore omitted in order to avoid redundancy.

The information processing device 20 includes a comparison section 25 in addition to the secondary conversion processing section 22, the communication section 26, the controller 27, and the storage 27s. The comparison section 25 performs comparison between the character code data RCD and the character code data OCD upon generation of the character code data RCD and the character code data OCD. The comparison section 25 generates a matching rate between the character code data RCD and the character code data OCD based on a result of comparison. When the character code data RCD is identical to the character code data OCD, the matching rate is 100%. When the character code data RCD is completely different from the character code data OCD, the matching rate is 0%.

The storage 27s stores matching rate information 27v therein. The storage 27s may further stores therein a threshold for matching rate determination. The matching rate information may be displayed on the display section 18 of the image reading device 10.

FIGS. 23A and 23B are each a schematic diagram illustrating a display screen displayed by the display section 18 upon selection of a workflow. As illustrated in FIGS. 23A and 23B, the display section 18 displays a display screen indicating a block for setting conversion processing information, reading resolutions, document sizes, document orientations, and an output destination of character code data. Note that the display screens in FIGS. 23A and 23B are respectively the same as the display screens illustrated in FIGS. 20B and 20C in almost all aspects other than that matching rate information is displayed at a site of the conversion processing information. Duplicate description is therefore omitted in order to avoid redundancy.

FIG. 23A is a schematic diagram of a display screen displayed by the display section 18 upon selection of the workflow 7. As illustrated in FIG. 23A, the matching rate information is displayed as the conversion processing information. The matching rate information herein indicates a matching rate between the character code data RCD and the character code data OCD in reading past documents relating to transportation expense reimbursement. The matching rate in FIG. 23A is 98%.

FIG. 23B is a schematic diagram of a display screen displayed by the display section 18 upon selection of the workflow 1. As illustrated in FIG. 23B, the matching rate information is displayed as the conversion processing information. The matching rate information herein indicates a matching rate between the character code data RCD and the character code data OCD in reading documents relating to past bills for the company A. The matching rate is 100% in FIG. 23B. In this case, it is understood that the secondary conversion processing by the secondary conversion processing section 22 has been sufficient and the primary conversion processing by the primary conversion processing section 14 has been unnecessary for at least the past bills for the company A. As such, the user of the image reading device 10 can determine whether or not the primary conversion processing section 14 is worth using rather than the secondary conversion processing section 22 in terms of the matching rate.

As described above, when the matching rate is 100%, it is needless to use the primary conversion processing section 14. Therefore, the display section 18 may display the primary conversion processing section 14 in a shaded manner so that the primary conversion processing section 14 is not to be selected. In a situation in which the matching rate is higher than a matching rate threshold, the display section 18 may display the primary conversion processing section 14 in a shaded manner.

The information processing device 20 converts image data to character code data in the above description with reference to FIGS. 1 to 23B, which should not be taken to limit the present embodiment. The information processing device 20 may be capable of extracting and processing a two-dimensional code of image data.

Furthermore, the information processing device 20 receives the target image data OG generated by document reading in the image reading device 10 in the above description with reference to FIGS. 1 to 23B, which should not be taken to limit the present embodiment. The information processing device 20 may receive the target image data OG from another device. For example, a device that transmits target image data to the information processing device 20 may be another information processing device such as a facsimile machine, a personal computer (PC), or a smartphone. The information processing device 20 may process image data attached to an email. Alternatively or additionally, the information processing device 20 may process image data received through fax communication.

Figure 24:
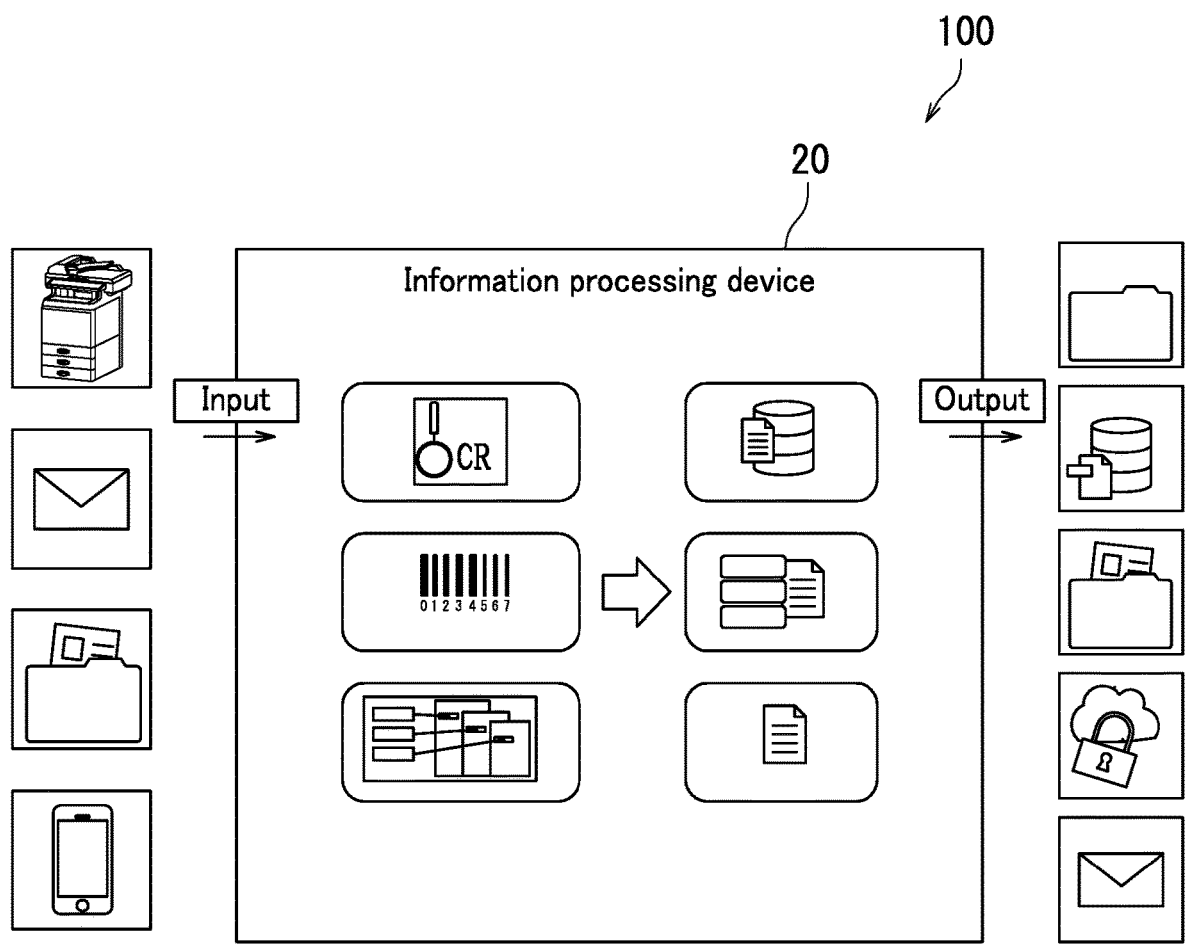
FIG. 24 is a schematic diagram of an information processing system according to the embodiment.

An information processing system 100 according to the present embodiment will be described next with reference to FIGS. 1 and 24. FIG. 24 is a schematic diagram of the information processing system 100 according to the present embodiment.

The information processing device 20 may receive the target image data OG from a multifunction peripheral, a server, or an information processing terminal. Furthermore, the information processing device 20 may receive the target image data OG via an email.

The information processing device 20 is capable of converting the target image data OG to character code data and also capable of extracting and reading two-dimensional code. The information processing device 20 stores converted character code data and data representing a read two-dimensional code. Furthermore, the information processing device 20 may store as metadata the converted character code data and the data representing the read two-dimensional code. For example, the data format may be any of XML, PDF, word processing software, spreadsheet software, and presentation software.

The information processing device 20 may store processed data in a specific storage element. For example, the information processing device 20 may store processed data in a storage element of the information processing device 20. Alternatively, the information processing device 20 may output processed data to an external device that is capable of storing the processed data. Alternatively or additionally, the information processing device 20 may transmit processed data via an email to an external device. For example, the information processing device 20 may transmit processed data to an external database or cloud storage. Alternatively, the information processing device 20 may transmit processed data to the image reading device 10 that has generated the image data.

A workflow for the information processing device 20 may be set in the image reading device 10. In this case, application installed in the image reading device 10 can be utilized.

The information processing device 20 converts image data to character code data in the above description with reference to FIGS. 1 to 24, which should not be taken to limit the present embodiment. The information processing device 20 may convert character code data to another character code data. Alternatively or additionally, the information processing device 20 may attach electronic signature to such character code data.

An embodiment of the present disclosure has been described so far with reference to the drawings. However, the present invention is not limited to the above-described embodiment, and is practicable in various manners within a scope not departing from the gist of the present invention. Appropriate combination of a plurality of elements of configuration disclosed in the above embodiment enables formation of various inventions. For example, some of all of the elements of configuration indicated in the embodiment may be omitted. Alternatively or additionally, elements of configuration in different embodiment examples may be combined as appropriate. The drawings schematically illustrate elements of configuration in order to facilitate understanding. Aspects such as thickness, length, the number, and intervals of each element of configuration illustrated in the drawings may differ from actual aspects thereof in order to facilitate preparation of the drawings. Furthermore, materials, shapes, dimensions, and the like of the elements of configuration described in the above embodiment are merely examples and are not intended as specific limitations. Various alterations may be made so long as there is no substantial deviation from the effects of the present disclosure.

What is claimed is:

1. An information processing system comprising:
an image reading device configured to read a document to generate target image data; and
an information processing device configured to process the target image data, wherein
the information processing device includes:
a first conversion processing section configured to convert image data to character code data;
a second conversion processing section configured to convert image data to character code data; and
a selection section configured to select conversion of the target image data to character code data by the first conversion processing section or the second conversion processing section, and
the second conversion processing section is set so that charges for use of the second conversion processing section increase as an increase in amount of use of the second conversion processing section.

2. An information processing system comprising:
an image reading device configured to read a document to generate target image data; and
an information processing device configured to process the target image data, wherein
the information processing device includes:
a first conversion processing section configured to convert image data to character code data;
a second conversion processing section configured to convert image data to character code data; and
a selection section configured to select conversion of the target image data to character code data by the first conversion processing section or the second conversion processing section, and
the first conversion processing section is set so that charges for use of the first conversion processing section do not change according to an amount of use of the first conversion processing section.

3. An information processing system comprising:
an image reading device configured to read a document to generate target image data; and
an information processing device configured to process the target image data, wherein
the information processing device includes:
a first conversion processing section configured to convert image data to character code data;
a second conversion processing section configured to convert image data to character code data; and
a selection section configured to select conversion of the target image data to character code data by the first conversion processing section or the second conversion processing section, and
the image reading device includes a primary conversion processing section configured to convert image data to character code data, and
when the information processing device receives character code data as a result of conversion of the target image data by the primary conversion processing section from the image reading device, neither the first conversion processing section nor the second conversion processing section converts the target image data to character code data, and
when the information processing device receives character code data as a result of conversion of the target image data by the primary conversion processing section from the image reading device, the first conversion processing section or the second conversion processing section converts the target image data to character code data.

4. The information processing system according to claim 3, wherein
the primary conversion processing section converts the image data to the character code data at a higher recognition rate than either the first conversion processing section or the second conversion processing section.

5. The information processing system according to claim 3, wherein
the primary conversion processing section is set so that charges for use of the primary conversion processing section increase as an increase in amount of use of the primary conversion processing section.

6. The information processing system according to claim 3, wherein
either the first conversion processing section or the second conversion processing section is set so that charges for use thereof do not change according to an amount of use thereof.

* * * * *